(12) United States Patent
Barnes et al.

(10) Patent No.: US 11,526,984 B2
(45) Date of Patent: Dec. 13, 2022

(54) METHOD OF COMPUTING TUMOR SPATIAL AND INTER-MARKER HETEROGENEITY

(71) Applicant: VENTANA MEDICAL SYSTEMS, INC., Tucson, AZ (US)

(72) Inventors: Michael Barnes, Tucson, AZ (US); Srinivas Chukka, Tucson, AZ (US); Anindya Sarkar, Tucson, AZ (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 122 days.

(21) Appl. No.: 16/890,459

(22) Filed: Jun. 2, 2020

(65) Prior Publication Data

US 2020/0302603 A1     Sep. 24, 2020

Related U.S. Application Data

(63) Continuation of application No. PCT/EP2018/083444, filed on Dec. 4, 2018.
(Continued)

(51) Int. Cl.
*G06T 7/00* (2017.01)
*G06T 7/11* (2017.01)
(Continued)

(52) U.S. Cl.
CPC .............. *G06T 7/0012* (2013.01); *G06T 7/11* (2017.01); *G06T 7/162* (2017.01); *G06T 7/30* (2017.01);
(Continued)

(58) Field of Classification Search
CPC ......... G06T 7/0012; G06T 7/162; G06T 7/11; G06T 7/30; G06T 2207/10024;
(Continued)

(56) References Cited

U.S. PATENT DOCUMENTS 5,650,327 A   7/1997 Copeland et al.
5,654,200 A   8/1997 Copeland et al.
(Continued)

FOREIGN PATENT DOCUMENTS

WO   2011049608 A2   4/2011
WO   2014102130 A1   7/2014
(Continued)

OTHER PUBLICATIONS

Demir et al., "Spectral Analysis of Cell-Graphs for Automated Cancer Diagnosis", BioMedSim, Available online at URL:http://www.cs.rpi.edu/~yener/PAPERS/biomedsim.pdf, May 27, 2005, 7 pages.
(Continued)

*Primary Examiner* — Bobbak Safaipour
*Assistant Examiner* — Day Tran
(74) *Attorney, Agent, or Firm* — Kilpatrick Townsend & Stockton LLP

(57) ABSTRACT

Automated systems and methods for determining the variability between derived expression scores for a series of biomarkers between different identified cell clusters in a whole slide image are presented. The variability between derived expression scores may be a derived inter-marker heterogeneity metric.

20 Claims, 11 Drawing Sheets

Related U.S. Application Data

(60) Provisional application No. 62/594,783, filed on Dec. 5, 2017.

(51) Int. Cl.
    *G06T 7/162*         (2017.01)
    *G06T 7/30*          (2017.01)

(52) U.S. Cl.
    CPC ............... *G06T 2207/10024* (2013.01); *G06T 2207/10056* (2013.01); *G06T 2207/20072* (2013.01); *G06T 2207/30024* (2013.01); *G06T 2207/30096* (2013.01)

(58) Field of Classification Search
    CPC . G06T 2207/10056; G06T 2207/20072; G06T 2207/30024; G06T 2207/30096
    See application file for complete search history.

(56) References Cited

U.S. PATENT DOCUMENTS

| | | |
|---|---|---|
| 6,296,809 B1 | 10/2001 | Richards et al. |
| 6,352,861 B1 | 3/2002 | Copeland et al. |
| 6,827,901 B2 | 12/2004 | Copeland et al. |
| 6,943,029 B2 | 9/2005 | Copeland et al. |
| 7,760,927 B2 | 7/2010 | Gholap et al. |
| 8,116,551 B2 * | 2/2012 | Gallagher ............ G06T 7/0014 382/128 |
| 8,712,130 B2 * | 4/2014 | Coenegrachts ....... G06T 7/0016 382/128 |
| 2003/0211630 A1 | 11/2003 | Richards et al. |
| 2004/0052685 A1 | 3/2004 | Richards et al. |
| 2004/0085443 A1 * | 5/2004 | Kallioniemi ......... G06V 20/693 348/135 |
| 2006/0036372 A1 * | 2/2006 | Yener ................... G06V 20/695 703/11 |
| 2008/0013812 A1 * | 1/2008 | Maenle ................ G06V 20/693 382/128 |
| 2009/0046909 A1 * | 2/2009 | Rutenberg ............... G06T 5/50 382/128 |
| 2012/0270808 A1 * | 10/2012 | Kolonin ............. C12N 15/1037 435/235.1 |
| 2015/0347702 A1 | 12/2015 | Chukka et al. |
| 2017/0076442 A1 * | 3/2017 | Schoenmeyer ........... G06T 7/11 |
| 2017/0103521 A1 | 4/2017 | Chukka et al. |
| 2017/0140246 A1 | 5/2017 | Barnes et al. |

FOREIGN PATENT DOCUMENTS

| | | |
|---|---|---|
| WO | 2014140085 | 9/2014 |
| WO | 2014195193 A1 | 12/2014 |
| WO | 2015049233 A1 | 4/2015 |
| WO | 2015124772 A1 | 8/2015 |
| WO | 2015181371 A1 | 12/2015 |
| WO | 2016075095 A2 | 5/2016 |
| WO | 2016075096 A1 | 5/2016 |
| WO | 2016087592 | 6/2016 |
| WO | 2016120442 A1 | 8/2016 |
| WO | 2016201186 A1 | 12/2016 |

OTHER PUBLICATIONS

Mahadevan et al., "Living Neural Networks: Dynamic Network Analysis of Developing Neural Progenitor Cells", BioRvix, Available online at https://www.biorxiv.org/content/biorxiv/early/2016/05/26/055533.full-text.pdf, May 26, 2016, 47 pages.
Newman et al., "Finding and Evaluating Community Structure in Networks", Arxiv.Org, Cornell University Library, XP080125358, Aug. 11, 2003, 16 pages.
PCT/EP2018/083444 , "International Search Report and Written Opinion", dated Mar. 22, 2019, 13 pages.
Sharma et al., "A Review of Graph-based Methods for Image Analysis in Digital Histopathology Single View Understanding View Project Telepathology in Croatia View Project a Review of Graph-based Methods for Image Analysis in Digital Histopathology", Diagnostic Pathology : The Diagnostic Pathology Journal, vol. 1, No. 61, Aug. 31, 2015, 51 pages.
Girvan, M. & Newman, M. E. J. (2002) Proc. Natl. Acad. Sci. USA 99, 7821-7826).
Anthonisse, J.M. (1971) Technical Report BN 971 (Stichting Mathematisch Centrum, Amsterdam), all pages.
Freeman, L. (1977) Sociometry 40), pp. 35-41.
Cuzick et al., "Prognostic Value of a Combined Estrogen Receptor, Progesterone Receptor, Ki-67, and Human Epidermal Grown Factor Receptor 2 Immunohistochemical Score and Comparison with the Genomic Health Recurrence Score in Early Breast Cancer", Journal of Cliencal Oncology, vol. 29, 2011, pp. 4273-4278.
Sambrook et al., "Molecular Cloning: A Laboratory Manual", Cold Spring Harbor Laboratory Press (1989), all pages.
Ausubel et al., "Current Protocols in Molecular Biology", Greene Publishing Associates and Wiley-Intersciences (1987), all pages.
Cf. Digital Image Processing, Third Edition, Rafael C. Gonzalez, Richard E. Woods, chapter I0, p. 689.
Handbook of Medical Imaging, Processing and Analysis, Isaac N. Bankman Academic Press, 2000, chapter 2.
Zimmermann, "Spectral Imaging and Linear Unmixing in Light Microscopy" Adv Biochem Engin/Biotechnol (2005) 95:245-265.
C. L. Lawson and R. J. Hanson, "Solving least squares Problems", PrenticeHall, 1974, Chapter 23, p. 161.
Parvin, Bahram, et al. "Iterative voting for inference of structural saliency and characterization of subcellular events." Image Processing, IEEE Transactions on 16.3 (2007): 615-623.
J. Kong, et al., "A comprehensive framework for classification of nuclei in digital microscopy imaging: An application to diffuse gliomas," in ISBI, 2011, pp. 2128-2131.
Xing et al. "Robust Nucleus/Cell Detection and Segmentation in Digital Pathology and Microscopy Images: A Comprehensive Review," IEEE Reviews in Biomedical Engineering, 2016, vol. 9, pp. 234-263.
Bulent Yener, "Cell-Graphs: Image-Driven Modeling of Structure-Function Relationship," Communications of the ACM, vol. 60 No. 1, 2017, pp. 74-84.
M. Fiedler, "Algebraic connectivity of graphs," Czechoslovak Mathematical Journal, vol. 23., 1973, pp. 298-305.
A. Pothen, H. Simon, and K.-P. Liou, "Partitioning sparse matrices with eigenvectors of graphs," SIAM J. Matrix Anal. Appl. vol. 11, No. 3, 1990, pp. 430-452.
Aaron Clauset et al., "Finding community structure in very large networks," Phys. Rev. E 70, 066111 (2004), all pages.
Paul Expert et al., "Uncovering space-independent communities in spatial networks," vol. 108 No. 19, 2011, pp. 7663-7668, doi: 10.1073/pnas.1018962108.
11th International Symposium on Biomedical Imaging (ISBI), 2014 IEEE, Apr. 29, 2014-May 2, 2014, all pages.
Barton et al., "Assessment of the Contribution of the IHC4+C Score to Decision Making in Clinical Practice in Early Breast Cancer", British Journal of Cancer, 2012, pp. 1760-1765.
Japan Application 2020-531075 received an Office Action, dated Jun. 29, 2022, all pages.
Lyzinski et al., "Community Detection and Classification in Hierarchical Stochastic Blockmodels", Network Science and Engineering, vol. 4. No. 1, 2017, all pages.
Kameyama, et al., "Feature Extraction of Cell Groups Using Growing Hierarchical Self-Organizing Map for Support of Diagnostic Tumor Cell Images", 2011, pp. 23-28.

\* cited by examiner

US 11,526,984 B2

METHOD OF COMPUTING TUMOR SPATIAL AND INTER-MARKER HETEROGENEITY

CROSS-REFERENCES TO RELATED APPLICATIONS

The present application is a continuation of International Application PCT/EP2018/083444, entitled "Method Of Computing Tumor Spatial And Inter-Marker Heterogeneity" and filed Dec. 4, 2018, which claims priority to U.S. Provisional Application No. 62/594,783, filed Dec. 5, 2017. Each of these applications is hereby incorporated by reference in its entirety for all purposes.

BACKGROUND

Digital pathology involves scanning of whole histopathology or cytopathology glass slides into digital images interpretable on a computer screen. These images are to be processed subsequently by an imaging algorithm or interpreted by a pathologist. In order to examine tissue sections (which are virtually transparent), tissue sections are prepared using colored histochemical stains that bind selectively to cellular components. Color-enhanced, or stained, cellular structures are used by clinicians or a computer-aided diagnosis (CAD) algorithm to identify morphological markers of a disease, and to proceed with therapy accordingly. Observing the assay enables a variety of processes, including diagnosis of disease, assessment of response to treatment, and development of new drugs to fight disease.

Immunohistochemical (IHC) slide staining can be utilized to identify proteins in cells of a tissue section and hence is widely used in the study of different types of cells, such as cancerous cells and immune cells in biological tissue. Thus, IHC staining may be used in research to understand the distribution and localization of the differentially expressed biomarkers of immune cells (such as T-cells or B-cells) in a cancerous tissue for an immune response study. For example, tumors often contain infiltrates of immune cells, which may prevent the development of tumors or favor the outgrowth of tumors.

In-situ hybridization (ISH) can be used to look for the presence of a genetic abnormality or condition such as amplification of cancer causing genes specifically in cells that, when viewed under a microscope, morphologically appear to be malignant. In situ hybridization (ISH) employs labeled DNA or RNA probe molecules that are anti-sense to a target gene sequence or transcript to detect or localize targeted nucleic acid target genes within a cell or tissue sample. ISH is performed by exposing a cell or tissue sample immobilized on a glass slide to a labeled nucleic acid probe which is capable of specifically hybridizing to a given target gene in the cell or tissue sample. Several target genes can be simultaneously analyzed by exposing a cell or tissue sample to a plurality of nucleic acid probes that have been labeled with a plurality of different nucleic acid tags. By utilizing labels having different emission wavelengths, simultaneous multicolored analysis may be performed in a single step on a single target cell or tissue sample.

SUMMARY

Tumors demonstrate a significant amount of heterogeneity in terms of observable features including tissue morphology, physiology and histology, gene expression, genotype, metastatic, angiogenic and proliferative potential. Some indications of heterogeneity include characteristics such as size, morphology and protein expression and behaviors like cell turnover, cell-cell interaction, invasive and metastatic ability and sensitivity to pharmacologic interventions. Cell heterogeneity may be linked to clinical outcomes. For example, an increase in heterogeneity may be linked to cancer progression in some types of cancers.

Within this in mind, Applicants have developed systems and methods for identifying homogeneous clusters of cells and deriving spatial heterogeneity and inter-marker heterogeneity metrics of the biological samples from different clusters of cells (e.g. clusters of tumor cells). As further disclosed herein, Applicants have developed systems and methods for mapping identified tumor or cell clusters in one image (e.g. a biomarker image stained in an IHC or ISH assay or an H&E image) to at least one differently stained image (or a series of different stained images), and then deriving expression scores for each identified tumor or cell cluster. In some embodiments, the derived expression scores for each tumor or cell cluster may be used to generate a heterogeneity metric or heterogeneity score, which serves a surrogate describing inter-cluster expression score variability. In some embodiments, the techniques disclosed herein may be applied to multiplexed image data to yield one or more metrics of sample heterogeneity of a biological sample. In addition, the present techniques assess heterogeneity to assess how cells are organized with respect to their neighbors, i.e. neighbors in one cluster as compared with their spatial organization in another cluster.

In one aspect of the present disclosure is a system for comparing heterogeneity between cell clusters, the system comprising: one or more processors, and a memory coupled to the one or more processors, the memory to store computer-executable instructions that, when executed by the one or more processors, cause the one or more processors to perform operations comprising: (i) classifying cells (e.g. as tumor cells, lymphocytes, stroma, etc.) within a first image of a biological sample having a first stain (e.g. a sample stained with H&E or a sample stained for a single biomarker); (ii) identifying one or more cell clusters within the first image, the cell clusters identified using a graph theoretic approach; (iii) registering the first image and at least one additional image to a common coordinate system such that the identified one or more clusters in the first image are mapped to the at least one additional image to provide mapped clusters, where the at least one additional image comprises a different stain; and (iv) detecting and classifying cells in the at least one additional image; and (v) deriving expression scores for each stain in each of the mapped clusters. In some embodiments, the system further comprises instructions for computing one or more inter-marker heterogeneity scores based on the derived expression scores. In some embodiments, the system further comprises instructions for computing one or more spatial heterogeneity scores based on the derived expression scores. In some embodiments, the system further comprises instructions for computing a metric to quantify the variability of the expression scores from different clusters. In some embodiments, the metric to quantify the variability of the expression scores from different clusters takes into consideration averages or weighted averages of the expression scores across the different clusters. In some embodiments, the first image is registered to a plurality of additional images, such that the identified one or more clusters in the first image are mapped to each of the plurality of additional images to provide mapped clusters, where each of the plurality of additional images comprises a different stain (or unmixed channel).

In some embodiments, the graph theoretic approach to identify the cell clusters comprises (i) constructing a spatial adjacency matrix of cells; and (ii) identifying coherent clusters of cells by detecting "community networks" in a graph. In some embodiments, the constructing of the spatial adjacency matrix for cells comprises (i) defining each cell as a node/vertex in the graph, (ii) identifying cell nodes spaced within about 30 to about 70 microns of each other as connected nodes; and (iii) defining as an edge the link between two connected nodes; and (iv) constructing an adjacency matrix for all the cells/vertices along with the connected edges information thereof. In some embodiments, the identification of the coherent clusters of cells includes (i) calculating a "betweenness" (as defined herein) of all existing edges in the network of cells; (ii) removing the edge having a highest betweenness; (iii) recalculating the betweenness of all edges affected by the removal; and (iv) repeating steps (ii) and (iii) until no edges remain. In some embodiments, the cells are classified as at least one of tumor cells, stromal cells, or lymphocytes.

In some embodiments, the first image is an H&E image, and wherein the at least one additional image is a biomarker image (e.g. an image stained for a particular biomarker such as in an IHC assay or an ISH assay). Of course, the above-identified system may utilize one or more multiplex images in place of simplex images and, in those embodiments, the multiplex images are unmixed prior to further processing. Where all of the input data is in the form of multiplex images, no registration step is needed. In some embodiments, the system further comprises instructions for electronically annotating the tumor and peri-tumor region in the image prior to the identification of the one or more cell clusters.

In another aspect of the present disclosure is a non-transitory computer-readable medium for deriving one or more metrics associated with inter-cluster cell heterogeneity comprising: (i) extracting features from a first image having a first stain, the extracted features used to classify cells within the first image; (ii) identifying one or more cell clusters within the first image based on the cell classification, the cell clusters identified by (a) constructing an adjacency matrix, and (b) identifying coherent clusters of cells using a community networks algorithm; (iii) registering the first image and at least one additional image to a common coordinate system such that the identified one or more clusters in the first image are mapped to the at least one additional image to provide mapped clusters, where the at least one additional image comprises a different stain; (iv) detecting and classifying cells in the at least one additional image; and (v) deriving expression scores for each stain in each of the mapped clusters.

In some embodiments, the non-transitory computer-readable medium comprises instructions for computing inter-marker heterogeneity scores based on the variability of the derived expression scores, i.e. an expression score vector. In some embodiments, the non-transitory computer-readable medium comprises instructions for computing a spatial heterogeneity to reflect the variability of the expression scores in each stained image and, considering the expression score vector of each mapped cluster as the expression scores from multiple stains of the mapped clusters, computing inter-marker heterogeneity scores based on the variability of the derived expression score vector.

In some embodiments, the non-transitory computer-readable medium further comprises instructions for the construction of the adjacency matrix, the instructions comprising (a) determining cell nodes; and (b) establishing edges between pairs of nodes. In some embodiments, the non-transitory computer-readable medium further comprises instructions for the identifying of coherent clusters of cells comprising (i) calculating a "betweenness" of all existing edges in the network of cells; (ii) removing the edge having a highest betweenness; (iii) recalculating the betweenness of all edges affected by the removal; and (iv) repeating steps (ii) and (iii) until no edges remain. In some embodiments, the non-transitory computer-readable medium further comprises instructions for identifying cell nodes located within about 50 microns of each other.

In some embodiments, the non-transitory computer-readable medium further comprises instructions for computing a transformation of the at least one additional image to a coordinate system of the first image. In some embodiments, the non-transitory computer-readable medium further comprises instructions for the calculation of the one or more intermarker-heterogeneity scores comprising calculating a standard deviation among a plurality of derived expression scores from the biomarker scores of all the stained slides from a biological sample. In some embodiments, the system further comprises instructions for the first image is stained with H&E. In some embodiments, the at least one additional image is stained for the presence of a biomarker. In some embodiments, the system further comprises instructions for the biomarkers are selected from the group consisting of estrogen receptor (ER), progesterone receptor (PR), Ki-67, and human epidermal growth factor receptor 2 (HER2). In some embodiments, the system further comprises instructions for the biomarkers are selected from the group consisting of PD-L1, CD3, and CD8.

In another aspect of the present disclosure is a method of computing inter-marker heterogeneity scores comprising: (a) classifying cells within a first image having a first stain; (b) identifying spatially homogeneous cell clusters in the first image based on the cell classification results; (c) mapping the identified spatially homogenous clusters from the first image to at least one additional image to provide mapped clusters in each image, wherein the at least one additional image has a different stain; (d) detecting and classifying cells in each of the additional stain images; and (e) deriving expression scores for each stain in each cluster in the first image and in each mapped cluster in the at least one additional image; and (0 calculating one or more inter-marker heterogeneity metrics. This method may be adapted to use multiplex images in addition to or in place of simplex images, as noted herein.

In some embodiments, the identifying of the spatially homogeneous cell clusters in the first image comprises (i) constructing a spatial adjacency matrix; and (ii) identifying coherent clusters of cells using a community networks algorithm. In some embodiments, the constructing of the spatial adjacency matrix of the detected cells comprises (i) denoting the detected cells as nodes; and (ii) identifying the connected nodes and associated edges for each node/cell/vertex and (iii) constructing the adjacency matrix. In some embodiments, the community networks algorithm to identify clusters iteratively removes edges and recalculates "betweenness" measures after each removal. In some embodiments, the community networks algorithm utilizes a spectral clustering technique. In some embodiments, the mapping of the identified spatially homogeneous clusters from the first image to the at least one additional image comprises computing a transformation of the at least one image to a coordinate system of the first image.

In some embodiments, the first image is stained with H&E. In some embodiments, the at least one additional image is stained for the presence of a biomarker. In some embodiments, the biomarkers are selected from the group consisting of estrogen receptor (ER), progesterone receptor (PR), Ki-67, and human epidermal growth factor receptor 2 (HER2). In some embodiments, the biomarkers are selected from the group consisting of PD-L1, CD3, and CD8. In some embodiments, the expression scores are selected from the group consisting of percent positivity and H-score. In some embodiments, the calculation of the one or more intermarker-heterogeneity scores comprises calculating a standard deviation among a plurality of derived expression scores across multiple biomarkers over different identified clusters. In some embodiments, the heterogeneity metric is a normalized H-score taken across one or more clusters. In some embodiments, the cells are classified at least as tumor cells, and wherein at least some of the identified spatially homogeneous cell clusters are clusters of tumor cells.

In some embodiments, the at least one additional image is a simplex image. In some embodiments, a plurality of additional images are provided, each being a simplex image. In some embodiments, the at least one additional image is an unmixed image channel image derived from a multiplex image. In some embodiments, the method further comprises annotating a portion of the input image for further analysis.

BRIEF DESCRIPTION OF THE DRAWINGS

For a general understanding of the features of the disclosure, reference is made to the drawings. In the drawings, like reference numerals have been used throughout to identify identical elements.

DETAILED DESCRIPTION

Figure 1:
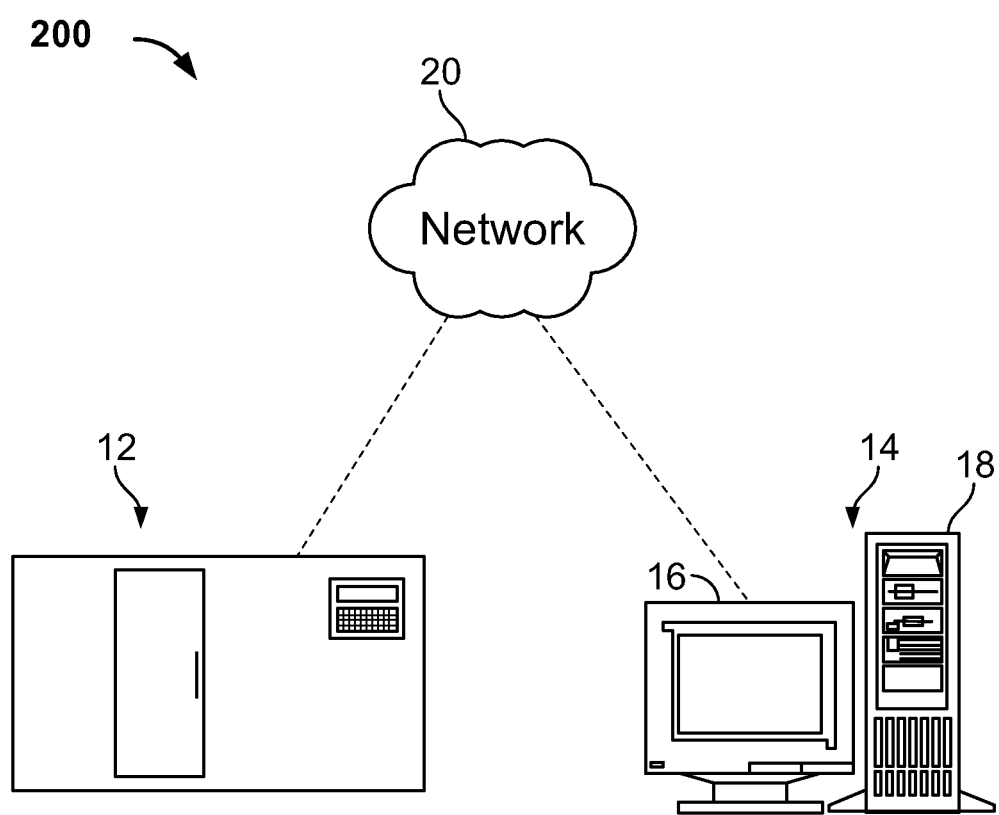
FIG. 1 illustrates a representative digital pathology system including an image acquisition device and a computer system, in accordance with some embodiments.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "betweenness" refers to a centrality measure of a vertex within a graph. Betweenness centrality quantifies the number of times a node acts as a bridge along the shortest path between two other nodes. Accordingly, the concept of betweenness is essentially a metric for measuring the centrality of any node in a given network. It may be characterized loosely as the number of times that a node needs a given node to reach another node. In practice, it is usually calculated as the fraction of shortest paths between node pairs that pass through the node of interest.

As used herein, the term "biological sample" or "tissue sample" refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, the terms "biomarker" or "marker" refer to a measurable indicator of some biological state or condition. In particular, a biomarker may be a protein or peptide, e.g. a surface protein, that can be specifically stained and which is indicative of a biological feature of the cell, e.g. the cell type or the physiological state of the cell. An immune cell marker is a biomarker that is selectively indicative of a feature that relates to an immune response of a mammal. A biomarker may be used to determine how well the body responds to a treatment for a disease or condition or if the subject is predisposed to a disease or condition. In the context of cancer, a biomarker refers to a biological substance that is indicative of the presence of cancer in the body. A biomarker may be a molecule secreted by a tumor or a specific response of the body to the presence of cancer. Genetic, epigenetic, proteomic, glycomic, and imaging biomarkers can be used for cancer diagnosis, prognosis, and epidemiology. Such biomarkers can be assayed in non-invasively collected biofluids like blood or serum. Several gene and protein based biomarkers have already been used in patient care including but, not limited to, AFP (Liver Cancer), BCR-ABL (Chronic Myeloid Leukemia), BRCA1/BRCA2 (Breast/Ovarian Cancer), BRAF V600E (Melanoma/Colorectal Cancer), CA-125 (Ovarian Cancer), CA19.9 (Pancreatic Cancer), CEA (Colorectal Cancer), EGFR (Non-small-cell lung carcinoma), HER-2 (Breast Cancer), KIT (Gastrointestinal stromal tumor), PSA (Prostate Specific Antigen), S100 (Melanoma), and many others. Biomarkers may be useful as diagnostics (to identify early stage cancers) and/or prognostics (to forecast how aggressive a cancer is and/or predict how a subject will respond to a particular treatment and/or how likely a cancer is to recur).

As used herein, the term "community" may be defined as a subset of nodes (e.g. cells or cell nodes) within a graph such that connections between the nodes are denser than connections with the rest of the network. The detection of the community structure in a network is generally intended as a procedure for mapping the network into a tree. In this tree (called a dendrogram in the social sciences), the leaves are the nodes whereas the branches join nodes or (at higher level) groups of nodes, thus identifying a hierarchical structure of communities nested within each other. Algorithms may be used to perform this mapping. A traditional method is the so-called hierarchical clustering (see Wasserman, S. & Faust, K. (1994) Social Network Analysis (Cambridge Univ. Press, Cambridge, U.K.). For every pair i,j of nodes in the network, one calculates a weight Wi,j, which measures how closely connected the vertices are. Starting from the set of all nodes and no edges, links are iteratively added between pairs of nodes in order of decreasing weight. In this way nodes are grouped into larger and larger communities, and the tree is built up to the root, which represents the whole network. Algorithms of this kind are called agglomerative. For the other class of algorithms, called divisive, the order of construction of the tree is reversed: one starts with the whole graph and iteratively cuts the edges, thus dividing the network progressively into smaller and smaller disconnected subnetworks identified as the communities. The crucial point in a divisive algorithm is the selection of the edges to be cut, which have to be those connecting communities and not those within them. Very recently, Girvan and Newman (GN) have introduced a divisive algorithm where the selection of the edges to be cut is based on the value of their "edge betweenness" (see Girvan, M. & Newman, M. E. J. (2002) Proc. Natl. Acad. Sci. USA 99, 7821-7826), a generalization of the centrality betweenness introduced by Anthonisse (see Anthonisse, J. M. (1971) Technical Report BN 971 (Stichting Mathematisch Centrum, Amsterdam).) and Freeman (see Freeman, L. (1977) Sociometry 40, 35-41). Consider the shortest paths between all pairs of nodes in a network. The betweenness of an edge is the number of these paths running through it. It is clear that, when a graph is made of tightly bound clusters, loosely interconnected, all shortest paths between nodes in different clusters have to go through the few interclusters connections, which therefore have a large betweenness value. The single step of the GN detection algorithm consists in the computation of the edge betweenness for all edges in the graph and in the removal of those with the highest score. The iteration of this procedure leads to the splitting of the network into disconnected subgraphs that in their turn undergo the same procedure, until the whole graph is divided in a set of isolated nodes. In this way, the dendrogram is built from the root to the leaves.

As used herein, the phrase "estrogen receptor" or the abbreviation "ER" refers to a member of the nuclear hormone family of intracellular receptors is activated by 17-beta-estradiol. Estrogen receptors are overexpressed in around 70% of breast cancer cases, referred to as "ER positive" (ER+).

As used herein, the term "field of view (FOV)" refers to an image portion that has a predetermined size and/or shape. In some embodiments, the FOV is a region in a digital image that is used for further manual or automated inspection and analysis. The FOV may be selected automatically or manually by analyzing some features of the digital image, e.g. by evaluating intensity values of the pixels of the digital image.

As used herein, the term "heterogeneity score" refers to an indication of the amount of protein expression heterogeneity of a biomarker in a sample, such as ER, HER2, Ki-67, or PR staining in a breast cancer sample. The heterogeneity score provides a measure of how different one cluster of cells is from another cluster of cells, for the same marker.

As used herein, the term "H-score" refers to an indication of protein expression that weights strongly stained cells more heavily than weakly stained cells. For example, an H-score can indicate the percentage of cells staining weakly (e.g., 1+) plus two times the percentage of cells staining moderately (e.g., 2+) plus three times the percentage of cells staining strongly (e.g., 3+) (for example see Cuzick et al., J. Clin. Oneal. 29:4273-8, 2011, incorporated herein by reference).

As used herein, the term "image data" encompasses raw image data acquired from the biological tissue sample, such as by means of an optical sensor or sensor array, or pre-processed image data. In particular, the image data may comprise a pixel matrix. As used herein, the term "immunohistochemistry" refers to a method of determining the presence or distribution of an antigen in a sample by detecting interaction of the antigen with a specific binding agent, such as an antibody. A sample is contacted with an antibody under conditions permitting antibody-antigen binding. Antibody-antigen binding can be detected by means of a detectable label conjugated to the antibody (direct detection) or by means of a detectable label conjugated to a secondary antibody, which binds specifically to the primary antibody (indirect detection).

As used herein, "Ki-67" refers a nuclear protein associated with cellular proliferation and ribosomal RNA transcription. Inactivation of antigen Ki-67 leads to inhibition of ribosomal RNA synthesis. Ki-67 is used, for example, as a marker of proliferation.

As used herein, the term "mask" refers to a derivative of a digital image wherein each pixel in the mask is represented as a binary value, e.g. "1" or "0" (or "true" or "false"). By overlaying a digital image with said mask, all pixels of the digital image mapped to a mask pixel of a particular one of the binary values are hidden, removed or otherwise ignored or filtered out in further processing steps applied on the digital image. For example, a mask can be generated from an original digital image by assigning all pixels of the original image with an intensity value above a threshold to true and otherwise false, thereby creating a mask that will filter out all pixels overlaid by a "false" masked pixel.

As used herein, the terms "multi-channel image" or "multiplex image" encompasses a digital image obtained from a biological tissue sample in which different biological structures, such as nuclei and tissue structures, are simultaneously stained with specific fluorescent dyes, quantum dots, chromogens, etc., each of which fluoresces or are otherwise detectable in a different spectral band thus constituting one of the channels of the multi-channel image.

As used herein, the terms "progesterone receptor" or "PR" refer to an intracellular steroid receptor that specifically binds progesterone. Progesterone receptors are overexpressed in some breast cancer cases, referred to as "PR positive" (PR+).

As used herein, the term "unmixed image" encompasses a grey-value or scalar image obtained for one channel of a multi-channel image. By unmixing a multi-channel image one unmixed image per channel is obtained.

Overview

The present disclosure relates to automated systems and methods for determining the variability between derived expression scores for a series of biomarkers between different identified cell clusters in a whole slide image. In some embodiments, the variability between derived expression scores may be a derived inter-marker heterogeneity metric.

At least some embodiments of the present disclosure relate to computer systems and methods for analyzing digital images captured from biological samples, including tissue samples, stained with one or more primary stains (e.g. hematoxylin and eosin (H&E)) and one or more detection probes (e.g. probes containing a specific binding entity which facilitates the labeling of targets within the sample). While particular examples herein may refer to specific tissues and/or the application of specific stains or detection probes for the detection of certain markers (and hence diseases), the skilled artisan will appreciate that different tissues and different stains/detection probes may be applied to detect different markers and different diseases. For example, certain disclosures refer to breast cancer and markers for breast cancer (e.g. ER, PR, Ki-67), and these disclosure represent a non-limiting embodiment.

Figure 2:
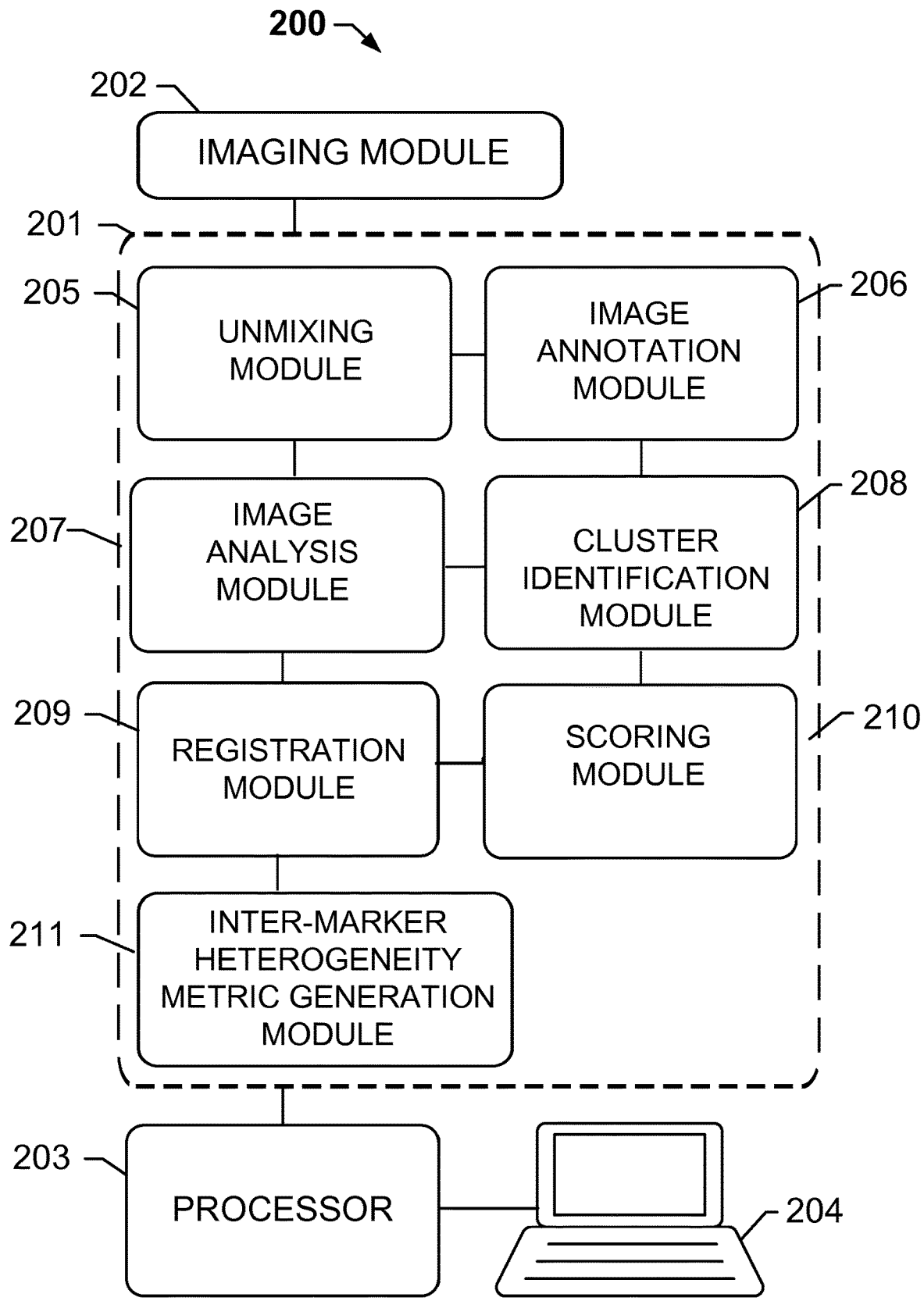
FIG. 2 sets forth various modules that can be utilized in a digital pathology system or within a digital pathology workflow, in accordance with some embodiments.

A digital pathology system 200 for imaging and analyzing specimens is illustrated in FIGS. 1 and 2. The digital pathology system 200 may comprise an imaging apparatus 12 (e.g. an apparatus having means for scanning a specimen-bearing microscope slide) and a computer 14 (or 204), whereby the imaging apparatus 12 and computer may be communicatively coupled together (e.g. directly, or indirectly over a network 20). The computer system 14 can include a desktop computer, a laptop computer, a tablet, or the like, digital electronic circuitry, firmware, hardware, memory 201, a computer storage medium, a computer program or set of instructions (e.g. where the program is stored within the memory or storage medium), a processor (including a programmed processor), and/or the like. The computing system 14 illustrated in FIG. 1 may comprise a computer with a display device 16 and an enclosure 18. The computer system can store digital images in binary form (locally, such as in a memory, on a server, or another network connected device). The digital images can also be divided into a matrix of pixels. The pixels can include a digital value of one or more bits, defined by the bit depth. The skilled artisan will appreciate that other computer devices or systems may be utilized and that the computer systems described herein may be communicatively coupled to additional components, e.g. specimen analyzers, microscopes, other imaging systems, automated slide preparation equipment, etc. Some of these additional components and the various computers, networks, etc. that may be utilized are described further herein.

In general, the imaging apparatus 12 (or other image source including pre-scanned images stored in a memory) can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus 12 is a brightfield imaging system, a multispectral imaging (MSI) system or a fluorescent microscopy system. The digitized tissue data may be generated, for example, by an image scanning system, such as an VENTANA iSCAN HT or VENTANA DP 200 by VENTANA MEDICAL SYSTEMS of Tucson, Ariz. or other suitable imaging equipment.

Additional imaging devices and systems are described further herein. The skilled artisan will appreciate that the digital color image acquired by the imaging apparatus 12 is conventionally composed of elementary color pixels. Each colored pixel is coded over three digital components, each comprising the same number of bits, each component corresponding to a primary color, generally red, green or blue, also denoted by the term "RGB" components.

FIG. 2 provides an overview of the various modules utilized within the presently disclosed digital pathology system. In some embodiments, the digital pathology system employs a digital pathology system 200 or computer-implemented method having one or more processors 203 and at least one memory 201, the at least one memory 201 storing non-transitory computer-readable instructions for execution by the one or more processors to cause the one or more processors to execute instructions (or stored data) in one or more modules (e.g. modules 202, and 205 through 211).

Figure 3A:
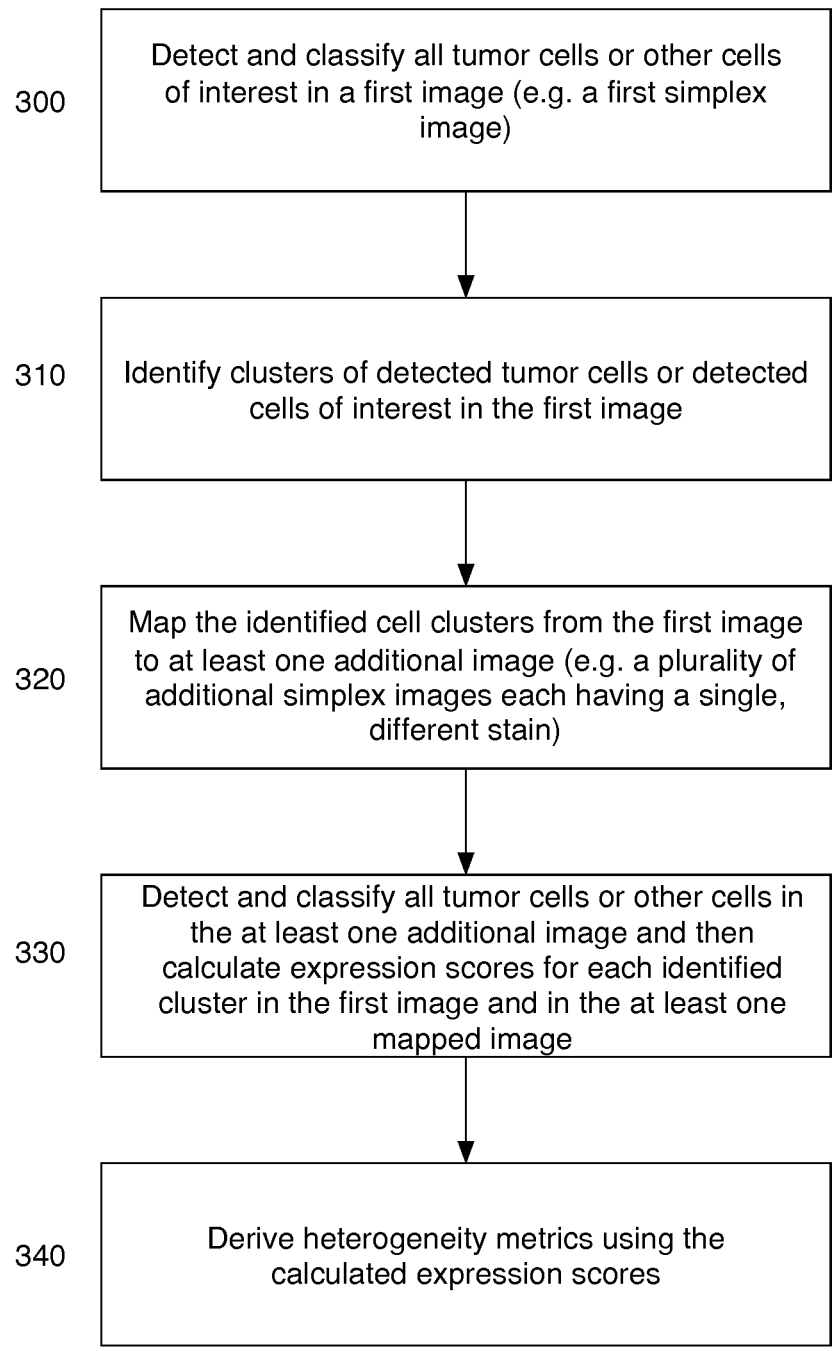
FIG. 3A provides an overview of the steps for deriving spatial heterogeneity metrics from one or more simplex images, in accordance with some embodiments.
Figure 3B:
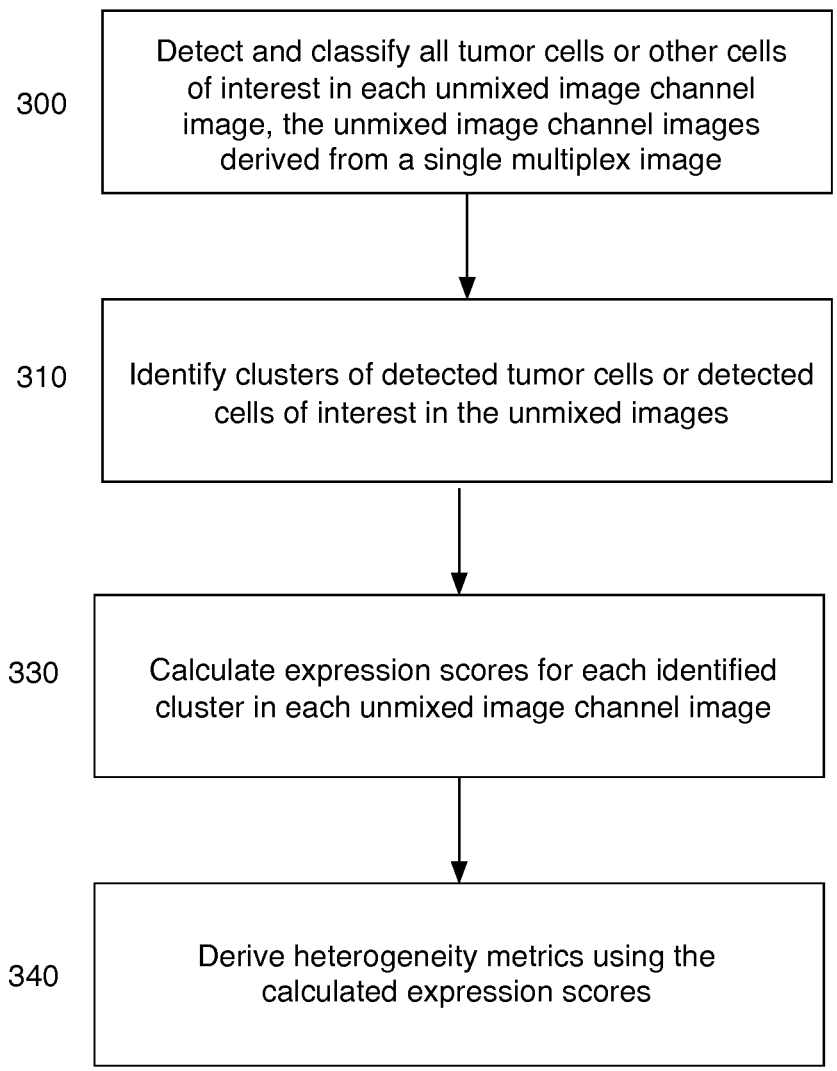
FIG. 3B provides an overview of the steps for deriving spatial heterogeneity metrics from a multiplex image, in accordance with some embodiments.

With reference to FIGS. 2, 3A, and 3B the present disclosure provides a computer-implemented method of assessing inter-marker tumor heterogeneity in acquired images (or a single multiple image). In some embodiments, the method may include: (a) running an image acquisition module 202 to generate or receive simplex image data (i.e. images where each has a single stain) or multiplex image data (i.e. an image having a plurality of stains) (step 300); (b) optionally running an image annotation module 206 to electronically annotate a portion of an image, such as a portion for further analysis, e.g. a portion denoting a tumor region or immune margin in pen-tumor region; (c) if the input image is a multiplex image, optionally running an unmixing module 205 to generate image channel images corresponding to one or more stain channels present in the multiplex image; (d) running an image analysis module 207 to detect and/or classify cells or nuclei based (such as tumor cells, stromal cells, lymphocytes, etc.) based on features within a first input image (i.e. within an H&E image, a biomarker image, or an unmixed image channel image); (e) running a cell cluster identification module 208 to identify clusters of tumor cells or clusters of other cells of interest (step 310) in the first image; (f) if the input images are simplex images, optionally running a registration module 209 to map the identified cluster of tumor cells or the identified clusters of other cells of interest (e.g. immune cells) from the first image to at least one additional image or a plurality of additional images (step 320); (g) running a scoring module 210 to derive expression scores for each biomarker in each identified cell cluster (step 330); and (h) running an inter-marker heterogeneity metric generation module to derive metrics describing the variability between derived expression scores in different clusters (step 340).

In some embodiments, the image analysis module 207 is also used to detect and/or classify cells in the at least one additional image (or the series of additional images), and this step may be performed in conjunction (i.e. at the same time or subsequently) with the detection and/or classification of cells in the first image, or at any other time during the workflow. The operations described above may, in some embodiments, provide a vector of marker expression scores from different stains for each cluster. The skilled artisan will also appreciate that additional modules may be incorporated into the workflow. As will be described in more detail herein, in some embodiments, an image processing or pre-processing module may be run to apply certain filters to the acquired images or to identify certain histological and/or morphological structures or features within the tissue samples. Likewise, a region of interest selection module may be utilized to select a particular portion of an image for analysis.

Image Acquisition Module

In some embodiments, as an initial step, and with reference to FIG. 2, the digital pathology system 200 runs an image acquisition module 202 to capture images or image data of a biological sample having one or more stains (i.e. the images may be simplex images or multiplex images). In some embodiments, the images received or acquired are RGB images or multispectral images. In some embodiments, the images captured are stored in memory 201.

The images or image data (used interchangeably herein) may be acquired using the imaging apparatus 12, such as in real-time. In some embodiments, the images are acquired from a microscope or other instrument capable of capturing image data of a specimen-bearing microscope slide, as noted herein. In some embodiments, the images are acquired using a 2D scanner, such as one capable of scanning image tiles. Alternatively, the images may be images that have been previously acquired (e.g. scanned) and stored in a memory 201 (or, for that matter, retrieved from a server via network 20).

In some embodiments, the system receives at least two images as input. In some embodiments, the images (again, either simplex or multiplex images) received as input are derived from serial tissue sections, i.e. serial sections derived from the same xenograft tissue block. In general, the at least two images received as input each comprise signals corresponding to a stain (including chromogens, fluorophores, quantum dots, etc.). In some embodiments, one of the images has been stained with at least one primary stain (hematoxylin or eosin), while another one of the images has been stained in at least one of an IHC assay or ISH assay for the identification of a specific biomarker (referred to herein as a "biomarker" image). In some embodiments, one of the images has been stained with both hematoxylin and eosin (referred to herein as an "H&E image"), while another one of the images has been stained in at least one of an IHC assay or ISH assay for the identification of a specific biomarker. In some embodiments, the input images may be multiplex images, i.e. stained for multiple, different markers in a multiplex assay according to methods known to those of ordinary skill in the art.

A typical biological sample is processed in an automated staining/assay platform that applies a stain to the sample. There are a variety of commercial products on the market suitable for use as the staining/assay platform, one example being the Discovery™ product of Ventana Medical Systems, Inc. (Tucson, Ariz.). The camera platform may also include a bright field microscope, such as the VENTANA iScan HT or the VENTANA DP 200 scanners of Ventana Medical Systems, Inc., or any microscope having one or more objective lenses and a digital imager. Other techniques for capturing images at different wavelengths may be used. Further camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure.

As the skilled artisan will appreciate, a biological sample may be stained for different types of nuclei and/or cell membrane biomarkers. Methods for staining tissue structures and guidance in the choice of stains appropriate for various purposes are discussed, for example, in "Sambrook et al., Molecular Cloning: A Laboratory Manual, Cold Spring Harbor Laboratory Press (1989)" and "Ausubel et al., Current Protocols in Molecular Biology, Greene Publishing Associates and Wiley-Intersciences (1987)," the disclosures of which are incorporated herein by reference.

By way of one non-limiting example, and in the context of detecting breast cancer, in some embodiments the tissue sample is stained in an IHC assay for the presence of one or biomarkers including an estrogen receptor marker, a progesterone receptor marker, a Ki-67 marker, or a HER2 marker. As such, in some embodiments, the biomarker image used as an input is an IHC image which comprises signals (the signals corresponding to stains which may be, for example, chromogenic or fluorescent) corresponding to a presence of at least one of an estrogen receptor (ER) marker, a progesterone receptor (PR) marker, a Ki-67 marker, or a HER2 marker. In some embodiments, the sample can be analyzed to detect or measure the presence of ER, HER2, Ki-67 and PR proteins in the sample, for example a qualitative or quantitative measurement. In some embodiments, the expression patterns of ER, HER2, Ki-67 and PR proteins can also be used to determine the heterogeneity of the protein expression, such as between different tumor or cell clusters as described further herein. In some examples, the antibodies for ER, PR, HER2 and Ki-67 are obtained from Ventana Medical Systems, Inc. (Tucson, Ariz.). However, one skilled in the art will appreciate that other antibodies that can be used in the methods and kits provided herein are commercially available from other sources, such as: Novus Biologicals (Littleton, Colo.), Santa Cruz biotechnology, Inc. (Santa Cruz, Calif.), Abeam (Cambridge, Mass.), and Invitrogen (Carlsbad, Calif.).

By way of another non-limiting example, and in the context of detecting non-small cell lung cancer, in some embodiments the tissue sample is stained in an IHC assay for the presence of one or biomarkers including a PD-L1 biomarker. As such, in some embodiments, the biomarker image used as an input is an IHC image which comprises signals corresponding to a presence of a PD-L1 marker, CD3 marker and CD8 marker.

Figure 4A:
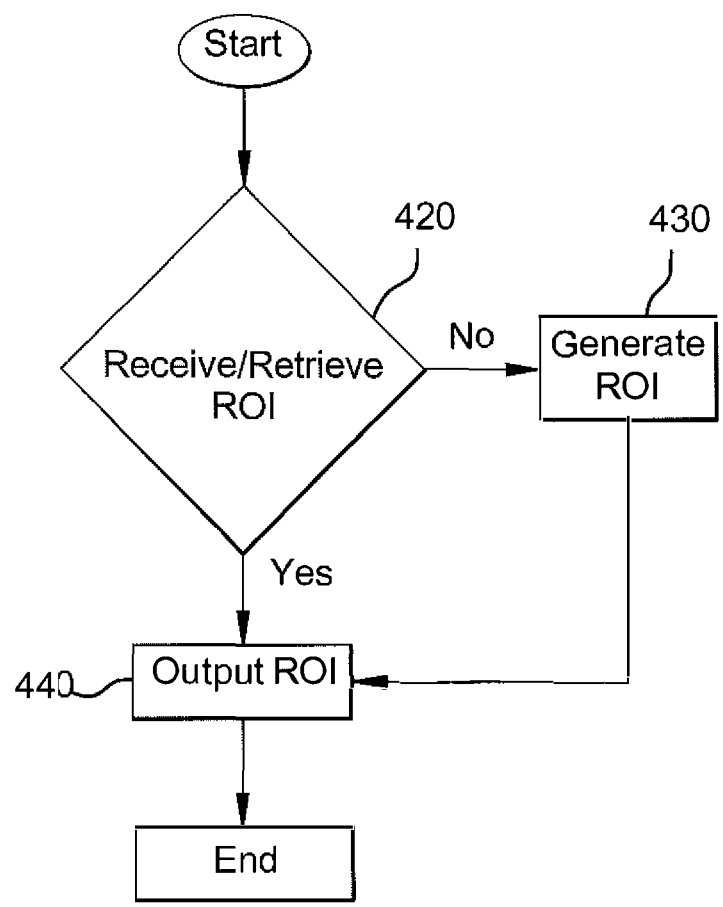
FIG. 4A provides a flow chart illustrating the steps of region selection, in accordance with some embodiments.
Figure 4B:
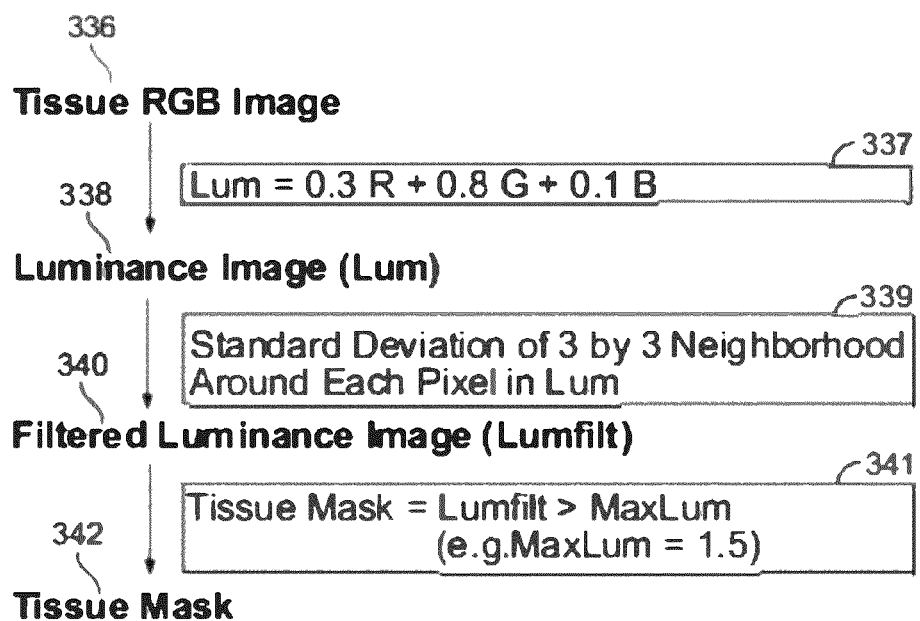
FIG. 4B sets forth a method of a masking tissue in a whole slide image, in accordance with some embodiments.

In some embodiments, the input images are optionally masked with a tissue masking module as described herein (see FIG. 4B). In some embodiments, the input images are masked such that only tissue regions are present in the images. In some embodiments, a tissue region mask is generated to mask non-tissue regions from tissue regions. In some embodiments, a tissue region mask may be created by identifying the tissue regions and excluding the background regions (e.g. regions of a whole slide image corresponding to glass with no sample, such as where there exists only white light from the imaging source). The skilled artisan will appreciate that in addition to masking non-tissue regions from tissue regions, the tissue masking module may also mask other areas of interest as needed, such as a portion of a tissue identified as belonging to a certain tissue type or belonging to a suspected tumor region. In some embodiments, a segmentation technique is used to generate the tissue region masked images by masking tissue regions from non-tissue regions in the input images. Suitable segmentation techniques are as such known from the prior art, (cf. Digital Image Processing, Third Edition, Rafael C. Gonzalez, Richard E. Woods, chapter 10, page 689 and Handbook of Medical Imaging, Processing and Analysis, Isaac N. Bankman Academic Press, 2000, chapter 2). In some embodiments, an image segmentation technique is utilized to distinguish between the digitized tissue data and the slide in the image, the tissue corresponding to the foreground and the slide corresponding to the background. In some embodiments, the component computes the Area of Interest (AoI) in a whole slide image in order to detect all tissue regions in the AoI while limiting the amount of background non-tissue area that is analyzed. A wide range of image segmentation techniques (e.g., HSV color-based image segmentation, Lab image segmentation, mean-shift color image segmentation, region growing, level set methods, fast marching methods, etc.) can be used to determine, for example, boundaries of the tissue data and non-tissue or background data. Based at least in part on the segmentation, the component can also generate a tissue foreground mask that can be used to identify those portions of the digitized slide data that correspond to the tissue data. Alternatively, the component can generate a background mask used to identify those portions of the digitized slide date that do not correspond to the tissue data.

This identification may be enabled by image analysis operations such as edge detection, etc. A tissue region mask may be used to remove the non-tissue background noise in the image, for example the non-tissue regions. In some embodiments, the generation of the tissue region mask comprises one or more of the following operations (but not limited to the following operations): computing the luminance of the low resolution input image, producing a luminance image, applying a standard deviation filter to the luminance image, producing a filtered luminance image, and applying a threshold to filtered luminance image, such that pixels with a luminance above a given threshold are set to one, and pixels below the threshold are set to zero, producing the tissue region mask. Additional information and examples relating to the generation of tissue region masks is disclosed in PCT/EP/2015/062015, entitled "An Image Processing Method and System for Analyzing a Multi-Channel Image Obtained from a Biological Tissue Sample Being Stained by Multiple Stains," the disclosure of which is hereby incorporated by reference herein in its entirety.

In some embodiments, a region of interest identification module may be used to select a portion of the biological sample for which an image or for which image data should be acquired. FIG. 4A provides a flow chart illustrating the steps of region selection. In step 420, the region selection module receives an identified region of interest or field of view. In some embodiments, the region of interest is identified by a user of a system of the present disclosure, or another system communicatively coupled to a system of the present disclosure. Alternatively, and in other embodiments, the region selection module retrieves a location or identification of a region or interest from a storage/memory. In some embodiments, as shown in step 430, the region selection module automatically generates a field of view (FOV) or a region of interest (ROI), for example, via methods described in PCT/EP2015/062015, the disclosure of which is hereby incorporated by reference herein in its entirety. In some embodiments, the region of interest is automatically determined by the system based on some predetermined criteria or characteristics that are in or of the image (e.g. for a biological sample stained with more than two stains, identifying an area of the image that comprises just two stains). In step 440, the region selection module outputs the ROI.

Image Annotation

In some embodiments, input images are optionally annotated by a user (e.g., a medical professional such as a pathologist) to image analysis using the image annotation module 206. In some embodiments, the user identifies portions (e.g. sub-regions) of an H&E image or a biomarker image (e.g. an IHC whole image) suitable for further analysis. The tumorous or immune regions annotated to generate the slide scores may either be whole tumor regions or a specified set of regions on the digital slide. For example, in some embodiments the identified portions are representative of over-expressive tumorous regions of a specific biomarker, e.g. a specific IHC marker. In other embodiments, a user, medical professional, or pathologist may annotate a whole tumor region on an H&E image.

In some embodiments, annotated representative fields may be selected by a pathologist to reflect the biomarker expression that the pathologist would use for overall slide interpretation. Annotations may be drawn using an annotation tool provided in a viewer application (e.g. VENTANA VIRTUOSO software) and the annotations may be drawn at any magnification or resolution. Alternatively, or in addition, image analysis operations may be used to automatically detect tumor regions or other regions using automated image-analysis operations such as segmenting, thresholding, edge detection, etc., and FOVs automatically generated based on the detected regions.

Unmixing Module

In some embodiments, the images received as input may be multiplex images, i.e. the image received is of a biological sample stained with more than one stain (e.g. an image stained for both ER and PR). In these embodiments, and prior to further processing, the multiple image is first unmixed into its constituent channels, such as with the unmixing module 205, where each unmixed channel corresponds to a particular stain or signal. In some embodiments, the unmixed images (often referred to as "channel images" or "image channel images") and may be used as the input for each module described herein. For example, inter-marker heterogeneity may be determined with a first H&E image, a second multiplex image stained for a plurality of cluster of differentiation markers (CD3, CD8, etc.), and a plurality of simplex images each stained for a particular biomarker (e.g. ER, PR, Ki67, etc.). In this example, the multiplex image is first unmixed into its constituent channel images, and those channel images may be used along with the H&E image and the plurality of simplex images to determined inter-marker heterogeneity.

In some embodiments, in a sample comprising one or more stains and hematoxylin, individual images may be produced for each channel of the one or more stains and hematoxylin. Without wishing to be bound by any particular theory, it is believed that these channels highlight different tissue structures in the tissue image, thus, they may be referred to as structural image channels. In some embodiments, unmixing provides at least a hematoxylin image channel image. In some embodiments, an acquired image is unmixed into a separate channel representing the local amounts of hematoxylin and highlighting nuclei regions within the image. The skilled artisan will appreciate that features extracted from these channels are useful in describing the different biological structures present within any image of a tissue.

The multi-spectral image provided by the imaging acquisition module 202 is a weighted mixture of the underlying spectral signals associated the individual biomarkers and noise components. At any particular pixel, the mixing weights are proportional to the biomarker expressions of the underlying co-localized biomarkers at the particular location in the tissue and the background noise at that location. Thus, the mixing weights vary from pixel to pixel. The spectral unmixing methods disclosed herein decompose the multichannel pixel value vector at each and every pixel into a collection of constituent biomarker end members or components and estimate the proportions of the individual constituent stains for each of the biomarkers.

Unmixing is the procedure by which the measured spectrum of a mixed pixel is decomposed into a collection of constituent spectra, or endmembers, and a set of corresponding fractions, or abundances, that indicate the proportion of each endmember present in the pixel. Specifically, the unmixing process can extract stain-specific channels to determine local concentrations of individual stains using reference spectra that are well known for standard types of tissue and stain combinations. The unmixing may use reference spectra retrieved from a control image or estimated from the image under observation. Unmixing the component signals of each input pixel enables retrieval and analysis of stain-specific channels, such as a hematoxylin channel and an eosin channel in H&E images, or a diaminobenzidine (DAB) channel and a counterstain (e.g., hematoxylin) channel in IHC images. The terms "unmixing" and "color deconvolution" (or "deconvolution") or the like (e.g. "deconvolving," "unmixed") are used interchangeably in the art.

In some embodiments, the multiplex images are unmixed with the unmixing module 205 using liner unmixing. Linear unmixing is described, for example, in 'Zimmermann "Spectral Imaging and Linear Unmixing in Light Microscopy" Adv Biochem Engin/Biotechnol (2005) 95:245-265' and in in C. L. Lawson and R. J. Hanson, "Solving least squares Problems", PrenticeHall, 1974, Chapter 23, p. 161,' the disclosures of which are incorporated herein by reference in their entirety. In linear stain unmixing, the measured spectrum (S(X)) at any pixel is considered a linear mixture of stain spectral components and equals the sum of the proportions or weights (A) of each individual stain's color reference (R(X)) that is being expressed at the pixel $$S(\lambda)=A_1 \cdot R_1(\lambda)+A_3 \cdot R_3(\lambda) \ldots A_i \cdot R_i(\lambda)$$

which can be more generally expressed as in matrix form as $$S(\lambda)=\Sigma A_i \cdot R_i(\lambda) \text{ or } S=R \cdot A$$

If there are M channels images acquired and N individual stains, the columns of the M×N matrix R are the optimal color system as derived herein, the N×1 vector A is the unknown of the proportions of individual stains and the M×1 vector S is the measured multichannel spectral vector at a pixel. In these equations, the signal in each pixel (S) is measured during acquisition of the multiplex image and the reference spectra, i.e. the optimal color system, is derived as described herein. The contributions of various stains ($A_i$) can be determined by calculating their contribution to each point in the measured spectrum. In some embodiments, the solution is obtained using an inverse least squares fitting approach that minimizes the square difference between the measured and calculated spectra by solving the following set of equations, $$[\partial \Sigma_j \{S(\lambda_j)-\Sigma_i A_i \cdot R_i(\lambda_j)\}2]/\partial A_i=0$$

In this equation, j represents the number of detection channels and i equals the number of stains. The linear equation solution often involves allowing a constrained unmixing to force the weights (A) to sum to unity.

In other embodiments, unmixing is accomplished using the methods described in WO2014/195193, entitled "Image Adaptive Physiologically Plausible Color Separation," filed on May 28, 2014, the disclosure of which is hereby incorporated by reference in its entirety herein. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric. In the case of low quality images or poor correlations against ideal results, one or more reference column vectors in matrix R are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended or not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems, and determining high-quality sets of reference vectors for the training assays.

In other embodiments, unmixing is accomplished using the methods described in WO2015/124772, entitled "Group Sparsity Model for Image Unmixing," filed on February 23, 215, the disclosure of which is hereby incorporated by reference in its entirety herein. In general, WO2015/124772 describes unmixing using a group sparsity framework, in which fractions of stain contributions from a plurality of colocation markers are modeled within a "same group" and fractions of stain contributions from a plurality of non-colocation markers are modeled in different groups, providing co-localization information of the plurality of colocation markers to the modeled group sparsity framework, solving the modeled framework using a group lasso to yield a least squares solution within each group, wherein the least squares solution corresponds to the unmixing of the colocation markers, and yielding a sparse solution among the groups that corresponds to the unmixing of the non-colocation markers. Moreover, WO2015124772 describes a method of unmixing by inputting image data obtained from the biological tissue sample, reading reference data from an electronic memory, the reference data being descriptive of the stain color of each one of the multiple stains, reading colocation data from electronic memory, the colocation data being descriptive of groups of the stains, each group comprising stains that can be collocated in the biological tissue sample, and each group forming a group for the group lasso criterion, at least one of the groups having a size of two or above, and calculating a solution of the group lasso criterion for obtaining the unmixed image using the reference data as a reference matrix. In some embodiments, the method for unmixing an image may comprise generating a group sparsity model wherein a fraction of a stain contribution from colocalized markers is assigned within a single group and a fraction of a stain contribution from non-colocalized markers is assigned within separate groups, and solving the group sparsity model using an unmixing algorithm to yield a least squares solution within each group.

Image Analysis Module

Following image acquisition and/or unmixing, input images or unmixed image channel images are used within an image analysis module 207 to identify and classify cells and/or nuclei (step 300). The procedures and algorithms described herein may be adapted to identify and classify various types of cells or cell nuclei based on features within the input images, including identifying and classifying tumor cells, non-tumor cells, stroma cells, lymphocytes, non-target stain, etc.

The skilled artisan will appreciate that the nucleus, cytoplasm and membrane of a cell have different characteristics and that differently stained tissue samples may reveal different biological features. Indeed, the skilled artisan will appreciate that certain cell surface receptors can have staining patterns localized to the membrane, or localized to the cytoplasm. Thus, a "membrane" staining pattern is analytically distinct from a "cytoplasmic" staining pattern. Likewise, a "cytoplasmic" staining pattern and a "nuclear" staining pattern are analytically distinct. Each of these distinct staining patterns may be used as features for identifying cells and/or nuclei. For example, stromal cells may be strongly stained by FAP, whereas tumor epithelial cells may be strongly stained by EpCAM, while cytokeratins may be stained by panCK. Thus, by utilizing different stains different cell types may be differentiated and distinguished during image analysis to provide a classification solution.

Methods of identifying, classifying, and/or scoring nuclei, cell membranes, and cell cytoplasm in images of biological samples having one or more stains are described in U.S. Pat. No. 7,760,927 ("the '927 Patent"), the disclosure of which is hereby incorporated by reference herein in its entirety. For example, the '927 Patent describes an automated method for simultaneously identifying a plurality of pixels in an input image of a biological tissue stained with a biomarker, including considering a first color plane of a plurality of pixels in a foreground of the input image for simultaneous identification of cell cytoplasm and cell membrane pixels, wherein the input image has been processed to remove background portions of the input image and to remove counterstained components of the input image; determining a threshold level between cell cytoplasm and cell membrane pixels in the foreground of the digital image; and determining simultaneously with a selected pixel and its eight neighbors from the foreground if the selected pixel is cell cytoplasm pixel, a cell membrane pixel or a transitional pixel in the digital image using the determined threshold level.

In some embodiments, tumor nuclei are automatically identified by first identifying candidate nuclei and then automatically distinguishing between tumor nuclei and non-tumor nuclei. Numerous methods of identifying candidate nuclei in images of tissue are known in the art. For example, automatic candidate nucleus detection can be performed by applying a radial-symmetry-base method, a radial-symmetry-based method of Parvin such as on the Hematoxylin image channel or a biomarker image channel after unmixing (see Parvin, Bahram, et al. "Iterative voting for inference of structural saliency and characterization of subcellular events." Image Processing, IEEE Transactions on 16.3 (2007): 615-623, the disclosure of which is incorporated by reference in its entirety herein).

More specifically, in some embodiments the images received as input are processed such as to detect nucleus centers (seeds) and/or to segment the nuclei. For example, instructions may be provided to detect nucleus centers based on radial-symmetry voting using the techniques of Parvin (noted above). In some embodiments, nuclei are detected using radial symmetry to detect centers of nuclei and then the nuclei are classified based on the intensity of stains around the cell centers. In some embodiments, a radial symmetry based nuclei detection operation is used as described in commonly-assigned and co-pending patent application WO2014140085A1, the entirety of which is incorporated herein by reference. For example, an image magnitude may be computed within an image and one or more votes at each pixel are accumulated by adding the summation of the magnitude within a selected region. Mean shift clustering may be used to find the local centers in the region, with the local centers representing actual nuclear locations. Nuclei detection based on radial symmetry voting is executed on color image intensity data and makes explicit use of the a priori domain knowledge that the nuclei are elliptical shaped blobs with varying sizes and eccentricities. To accomplish this, along with color intensities in the input image, image gradient information is also used in radial symmetry voting and combined with an adaptive segmentation process to precisely detect and localize the cell nuclei. A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. For instance, nuclei seed detection involves defining a seed as a point which is assumed to lie inside a cell nucleus and serve as the starting point for localizing the cell nuclei. The first step is to detect seed points associated with each cell nuclei using a highly robust approach based on the radial symmetry to detect elliptical-shaped blobs, structures resembling cell nuclei. The radial symmetry approach operates on the gradient image using a kernel based voting procedure. A voting response matrix is created by processing each pixel that accumulates a vote through a voting kernel. The kernel is based on the gradient direction computed at that particular pixel and an expected range of minimum and maximum nucleus size and a voting kernel angle (typically in the range [$\pi/4$, $\pi/8$]). In the resulting voting space, local maxima locations that have a vote value higher than a predefined threshold value are saved out as seed points. Extraneous seeds may be discarded later during subsequent segmentation or classification processes. Other methods are discussed in US Patent Publication No. 2017/0140246, the disclosure of which is incorporated by reference herein.

After candidate nuclei are identified, they are further analyzed to distinguish tumor nuclei from other candidate nuclei. The other candidate nuclei may be further classified (for example, by identifying lymphocyte nuclei and stroma nuclei). In some embodiments, a learnt supervised classifier is applied to identify tumor nuclei, as described further herein. For example, the learnt supervised classifier is trained on nuclei features to identify tumor nuclei and then applied to classify the nucleus candidate in the test image as either a tumor nucleus or a non-tumor nucleus. Optionally, the learnt supervised classifier may be further trained to distinguish between different classes of non-tumor nuclei, such as lymphocyte nuclei and stromal nuclei. In some embodiments, the learnt supervised classifier used to identify tumor nuclei is a random forest classifier. For example, the random forest classifier may be trained by: (i) creating a training set of tumor and non-tumor nuclei, (ii) extracting features for each nucleus, and (iii) training the random forest classifier to distinguish between tumor nuclei and non-tumor nuclei based on the extracted features. The trained random forest classifier may then be applied to classify the nuclei in a test image into tumor nuclei and non-tumor nuclei. Optionally, the random forest classifier may be further trained to distinguish between different classes of non-tumor nuclei, such as lymphocyte nuclei and stromal nuclei.

Nuclei may be identified using other techniques known to those of ordinary skill in the art. For example, an image magnitude may be computed from a particular image channel of one of the H&E or IHC images, and each pixel around a specified magnitude may be assigned a number of votes that is based on a summation of the magnitude within a region around the pixel. Alternatively, a mean shift clustering operation may be performed to find the local centers within a voting image, which represents the actual location of the nucleus. In other embodiments, nuclear segmentation may be used to segment the entire nucleus based on the now-known centers of the nuclei via morphological operations and local thresholding. In yet other embodiments, model based segmentation may be utilized to detect nuclei (i.e. learning the shape model of the nuclei from a training data set and using that as the prior knowledge to segment the nuclei in the testing image).

In some embodiments, the nuclei are then subsequently segmented using thresholds individually computed for each nucleus. For example, Otsu's method may be used for segmentation in a region around an identified nucleus since it is believed that the pixel intensity in the nuclear regions varies. As will be appreciated by those of ordinary skill in the art, Otsu's method is used to determine an optimal threshold by minimizing the intra-class variance and is known to those of skill in the art. More specifically, Otsu's method is used to automatically perform clustering-based image thresholding or, the reduction of a gray level image to a binary image. The algorithm assumes that the image contains two classes of pixels following a bi-modal histogram (foreground pixels and background pixels). It then calculates the optimum threshold separating the two classes such that their combined spread (intra-class variance) is minimal, or equivalent (because the sum of pairwise squared distances is constant), so that their inter-class variance is maximal.

In some embodiments, the systems and methods further comprise automatically analyzing spectral and/or shape features of the identified nuclei in an image for identifying nuclei of non-tumor cells. For example, blobs may be identified in the first digital image in a first step. A "blob" as used herein can be, for example, a region of a digital image in which some properties, e.g. the intensity or grey value, are constant or vary within a prescribed range of values. All pixels in a blob can be considered in some sense to be similar to each other. For example, blobs may be identified using differential methods which are based on derivatives of a function of position on the digital image, and methods based on local extrema. A nuclear blob is a blob whose pixels and/or whose outline shape indicate that the blob was probably generated by a nucleus stained with the first stain. For example, the radial symmetry of a blob could be evaluated to determine if the blob should be identified as a nuclear blob or as any other structure, e.g. a staining artifact. For example, in case a blob has a lengthy shape and is not radially symmetric, said blob may not be identified as a nuclear blob but rather as a staining artifact. Depending on the embodiment, a blob identified to be a "nuclear blob" may represent a set of pixels which are identified as candidate nuclei and which may be further analyzed for determining if said nuclear blob represents a nucleus. In some embodiments, any kind of nuclear blob is directly used as an "identified nucleus." In some embodiments, filtering operations are applied on the identified nuclei or nuclear blobs for identifying nuclei which do not belong to biomarker-positive tumor cells and for removing said identified non-tumor nuclei from the list of already identified nuclei or not adding said nuclei to the list of identified nuclei from the beginning. For example, additional spectral and/or shape features of the identified nuclear blob may be analyzed to determine if the nucleus or nuclear blob is a nucleus of a tumor cell or not. For example, the nucleus of a lymphocyte is larger than the nucleus of other tissue cell, e.g. of a lung cell. In case the tumor cells are derived from a lung tissue, nuclei of lymphocytes are identified by identifying all nuclear blobs of a minimum size or diameter which is significantly larger than the average size or diameter of a normal lung cell nucleus. The identified nuclear blobs relating to the nuclei of lymphocytes may be removed (i.e., "filtered out from") the set of already identified nuclei. By filtering out the nuclei of non-tumor cells, the accuracy of the method may be increased. Depending on the biomarker, also non-tumor cells may express the biomarker to a certain extent, and may therefore produce an intensity signal in the first digital image which does not stem from a tumor cell. By identifying and filtering out nuclei which do not belong to tumor cells from the totality of the already identified nuclei, the accuracy of identifying biomarker-positive tumor cells may be increased. These and other methods are described in US Patent Publication 2017/0103521, the disclosure of which is incorporated by reference herein in its entirety. In some embodiments, once the seeds are detected, a locally adaptive thresholding method may be used, and blobs around the detected centers are created. In some embodiments, other methods may also be incorporated, such as marker based watershed algorithms can also be used to identify the nuclei blobs around the detected nuclei centers. These and other methods are described in co-pending application PCT/EP2016/051906, published as WO2016/120442, the disclosure of which is incorporated by reference herein in its entirety.

Following detection of the nuclei, features (or metrics) are derived from within the input image. The derivation of metrics from nuclear features are well known in the art and any nuclear features known may be used in the context of the present disclosure. Non-limiting examples of metrics that may be computed include:

(A) Metrics Derived from Morphology Features

A "morphology feature" as used herein is, for example, a feature being indicative of the shape or dimensions of a nucleus. Without wishing to be bound by any particular theory, it is believed that morphological features provide some vital information about the size and shape of a cell or its nucleus. For example, a morphology feature may be computed by applying various image analysis algorithms on pixels contained in or surrounding a nuclear blob or seed. In some embodiments, the morphology features include area, minor, and major axis lengths, perimeter, radius, solidity, etc. At the cellular level, such features are used to classify a nucleus as belonging to a healthy or diseased cell. At the tissue level, the statistics of these features over the tissue are exploited in the classification of a tissue as diseased or not.

(B) Metrics Derived from Appearance Features

An "appearance feature" as used herein is, for example, a feature having been computed for a particular nucleus by comparing pixel intensity values of pixels contained in or surrounding a nuclear blob or seed used for identifying the nucleus, whereby the compared pixel intensities are derived from different image channels (e.g. a background channel, a channel for the staining of a biomarker, etc.). In some embodiments, the metrics derived from appearance features are computed from percentile values (e.g. the 10th, 50th, and 95th percentile values) of pixel intensities and of gradient magnitudes computed from different image channels. For example, at first, a number P of X-percentile values (X=10, 50, 95) of pixel values of each of a plurality IC of image channels (e.g. three channels: HTX, DAB, luminance) within a nuclear blob representing the nucleus of interest are identified. Computing appearance feature metrics may be advantageous since the derived metrics may describe the properties of the nuclear regions as well as describe the membrane region around the nuclei.

(C) Metrics Derived from Background Features

A "background feature" is, for example, a feature being indicative of the appearance and/or stain presence in cytoplasm and cell membrane features of the cell comprising the nucleus for which the background feature was extracted from the image. A background feature and a corresponding metrics can be computed for a nucleus and a corresponding cell depicted in a digital image e.g. by identifying a nuclear blob or seed representing the nucleus; analyzing a pixel area (e.g. a ribbon of 20 pixels—about 9 microns—thickness around the nuclear blob boundary) directly adjacent to the identified set of cells are computed in, therefore capturing appearance and stain presence in cytoplasm and membrane of the cell with this nucleus together with areas directly adjacent to the cell. These metrics are similar to the nuclear appearance features, but are computed in a ribbon of about 20 pixels (about 9 microns) thickness around each nucleus boundary, therefore capturing the appearance and stain presence in the cytoplasm and membrane of the cell having the identified nucleus together with areas directly adjacent to the cell. Without wishing to be bound by any particular theory, the ribbon size is selected because it is believed that it captures a sufficient amount of background tissue area around the nuclei that can be used to provide useful information for nuclei discrimination. These features are similar to those disclosed by "J. Kong, et al., "A comprehensive framework for classification of nuclei in digital microscopy imaging: An application to diffuse gliomas," in ISBI, 2011, pp. 2128-2131" the disclosure of which is incorporated by reference in its entirety herein. It is believed that these features may be used to determine whether the surrounding tissue is stroma or epithelium (such as in H&E stained tissue samples). Without wishing to be bound by any particular theory, it is believed that these background features also capture membrane staining patterns, which are useful when the tissue samples are stained with appropriate membrane staining agents.

(D) Metrics Derived from Color.

In some embodiments, metrics derived from color include color ratios, R/(R+G+B). or color principal components. In other embodiments, metrics derived from color include local statistics of each of the colors (mean/median/variance/std dev) and/or color intensity correlations in a local image window.

(E) Metrics Derived from Intensity Features

The group of adjacent cells with certain specific property values is set up between the dark and the white shades of grey colored cells represented in a histopathological slide image. The correlation of the color feature defines an instance of the size class, thus this way the intensity of these colored cells determines the affected cell from its surrounding cluster of dark cells.

(F) Metris Derived from Texture Features

Examples of texture features and methods of their derivation are described in PCT Publication Nos. WO/2016/075095 and WO/2016/075096, the disclosures of which is incorporated by reference herein in their entireties.

(G) Metrics Derived from Spatial Features

In some embodiments, spatial features include a local density of cells; average distance between two adjacent detected cells; and/or distance from a cell to a segmented region.

(H) Metrics Derived from Nuclear Features

The skilled artisan will also appreciate that metrics may also be derived from nuclear features. The computation of such nuclear features is described by Xing et al. "Robust Nucleus/Cell Detection and Segmentation in Digital Pathology and Microscopy Images: A Comprehensive Review," IEEE Rev Biomed Eng 9, 234-263, January 2016, the disclosure of which is hereby incorporated by reference herein in its entirety.

Of course, other features, as known to those of ordinary skill in the art, may be considered and used as the basis for computation of features.

By way of another example, cells may be classified as lymphocytes, such as described in PCT Publication No. WO/2016/075096, the disclosure of which is incorporated by reference herein in its entirety. In particular, PCT Publication No. WO/2016/075096 describes a computer-implemented method of classifying cells within an image of a tissue sample stained in an IHC assay for the presence of a PD-L1 biomarker comprising computing nuclear feature metrics from features of nuclei within the image of the tissue sample; computing contextual information metrics based on nuclei of interest with the image of the tissue sample; and classifying the cells within the image of the tissue sample using a combination of the nuclear feature metrics and contextual information metrics (as input of the classifier), wherein the cells are classified as at least one of positive immune cells, positive tumor cells, negative immune cells, and negative tumor cells, or other cells. In some embodiments, the method further comprises the step of creating a foreground segmentation mask to identify individual nuclei within the cells. The publication further describes that, in the context of PD-L1-stained tissue, regions with lymphocytes that do not express the PD-L1 biomarker ("negative lymphocytes") are characterized by small blue blobs; regions with lymphocytes that do express the PD-L1 biomarker ("positive lymphocytes") are characterized by small blue blobs and brown blobs; tumor regions with cells predominantly expressing the PD-L1 biomarker ("positive tumor cells") are characterized by large blue blobs and brown rings; and tumor regions where cells do not express the PD-L1 biomarker ("negative tumor cells") are characterized by large blue blobs only.

In some embodiments, the image analysis module 207 is run more than once. For example, the image analysis module 207 is run a first time to extract features and classify cells and/or nuclei in a first image; and then run a second time to extract features and classify cells and/or nucleic in additional images (e.g. one additional image, a plurality of additional images, or a series of additional images), where the additional images may be other simplex images or unmixed image channel images, or any combination thereof.

After features are derived, the feature may be used alone or in conjunction with training data (e.g. during training, example cells are presented together with a ground truth identification provided by an expert observer according to procedures known to those of ordinary skill in the art) to classify nuclei or cells. In some embodiments, the system can include a classifier that was trained based at least in part on a set of training or reference slides for each biomarker. The skilled artisan will appreciate that different sets of slides can be used to train a classifier for each biomarker. Accordingly, for a single biomarker, a single classifier is obtained after training. The skilled artisan will also appreciate that since there is variability between the image data obtained from different biomarkers, a different classifier can be trained for each different biomarker so as to ensure better performance on unseen test data, where the biomarker type of the test data will be known. The trained classifier can be selected based at least in part on how best to handle training data variability, for example, in tissue type, staining protocol, and other features of interest, for slide interpretation.

In some embodiments, the classification module is a Support Vector Machine ("SVM"). In general, a SVM is a classification technique, which is based on statistical learning theory where a nonlinear input data set is converted into a high dimensional linear feature space via kernels for the non-linear case. Without wishing to be bound by any particular theory, it is believed that support vector machines project a set of training data, E, that represents two different classes into a high-dimensional space by means of a kernel function, K. In this transformed data space, nonlinear data are transformed so that a flat line can be generated (a discriminating hyperplane) to separate the classes so as to maximize the class separation. Testing data are then projected into the high-dimensional space via K, and the test data are classified on the basis of where they fall with respect to the hyperplane. The kernel function K defines the method in which data are projected into the high-dimensional space.

In other embodiments, classification is performed using an AdaBoost algorithm. The AdaBoost is an adaptive algorithm which combines a number of weak classifiers to generate a strong classifier. Image pixels identified by a pathologist during the training stage (e.g. those having a particular stain or belonging to a particular tissue type) are used to generate probability density functions for each of the individual texture features $\Phi j$, for $j \in \{1, \ldots, K\}$ which are considered as weak classifiers. Bayes Theorem is then used to generate likelihood scenes $Lj=(Cj, 1j \in \{1, \ldots, K\})$ for each $\Phi j$ which constitute the weak learners. These are combined by the AdaBoost algorithm into a strong classifier $\Pi j = \Sigma Ti = 1 \alpha ji lji$ where for every pixel $cj = \in Cj$, $\Pi j(cj)$ is the combined likelihood that pixel cj belongs to class $\omega T$, where $\alpha ji$ is the weight determined during training for feature $\Phi h$, and T is the number of iterations.

Cell Cluster Identification Module

Figure 5:
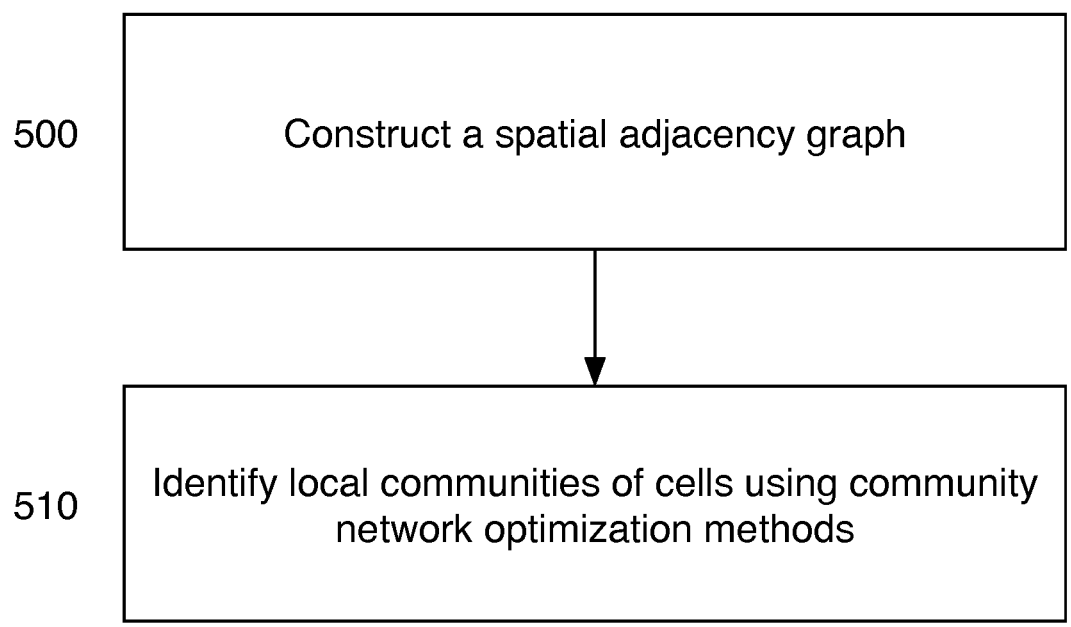
FIG. 5 provides an overview of the steps for identifying cell clusters, in accordance with some embodiments.

Next, a cell cluster identification module 208 is run to identify spatial clusters within one of the input (simplex) images or one of the unmixed image channel images derived from a multiplex image. This module will associate a cluster detected in the first image to a cluster in other images, e.g. other biomarker images. With reference to FIGS. 3A, 3B and 5, following detection and/or classification of all tumor cells or other cells of interest in one of the input images (step 300), the identification module 208 is used to identify clusters of detected tumor cells or other detected cells of interest in the input image (i.e. either the simplex image or unmixed image channel image). The identified clusters in this first image may then be subsequently mapped to another input image, as described further herein.

In some embodiments, the cluster identification module 208 may be utilized to identify cell clusters, e.g. tumor clusters and/or lymphocyte aggregate clusters, within an H&E image, and then the registration module 209 may be utilized to map those cell clusters to one or more biomarker images (e.g. other acquired simplex images comprising a single stain). Thus, in some embodiments, the cluster identification module 208 is used to identify tumor clusters or clusters of other cells of interest in an H&E image. Alternatively, in other embodiments, the cluster identification module 208 is used to identify tumor clusters or clusters of other cells of interest in a biomarker image stained with a first biomarker (e.g. an IHC image or an ISH image), and again those identified tumor clusters or clusters of other cells may be mapped to another biomarker image (e.g. an IHC images or an ISH image having a second stain).

With reference to FIG. 5, following cell detection and classification using the image analysis module 207, a cell-graph, spatial adjacency graph or spatial adjacency matrix is constructed using the cell classification data (step 500). Given cell level classification results on the input image and the spatial distribution of cells, the spatial adjacency matrix may be constructed. Next, an algorithm is used to detect "community networks" in the spatial adjacency matrix (step 510). Each of these steps will be described in further detail herein.

The cell-graph approach generalizes graph-based approaches by allowing an arbitrary edge function between a pair of nodes (here, cells) based on a biological hypothesis on their pairwise relationship. In a cell-graph approach, cells or cell clusters of a sample tissue are the vertices. An edge is defined between a pair of cells or cell clusters based on an assumption that has a biological foundation (or hypothesis). The nodes of the cell-graph are the individual cells. Thus, links of a cell-graph aim to capture the biological interactions in the underlying tissue. In some embodiments, the creation of a cell-graph comprises (i) identifying nodes; and (ii) establishing edges in the cell-graph. In some embodiments, after determining the vertex set V, an edge (u,v) between a pair of nodes u and v can be defined by making use of the biological insight and knowledge of a "feature distance," which can be a simple spatial Euclidean distance between the cell centers or Euclidean distance defined on the feature values of the two cells, as described herein. Using the feature distance, we translate the pairwise spatial relation between every two nodes to the possible existence of links in a cell-graph. The feature distance constitutes the "weight" of the edge between the two cells. Alternatively, an edge (u,v) can be established probabilistically or deterministically or a combination of these two methods. For example, in probabilistic cell-graphs the probability of creating a link between any two nodes may decay exponentially with the Euclidean distance between them employing a probability function $P(u,v) = e^{d(u,v)/(L)}$ where $d(u, v)$ is the Euclidean distance, and L is the largest Euclidean distance between two nodes of the grid. An edge (u,v) can be established deterministically if the distance d(u,v) is less than a threshold (for example, two cells are physically touching each other). Without wishing to be bound by any particular theory, it is believed that that the presence of a link between nodes does not specify what kind of relationship exists between the nodes (cells); it simply indicates that a relationship of some sort is hypothesized to exist, and that it is dependent on the distance between cells. Additional methods of creating cell-graphs are described by Bülent Yener, "Cell-Graphs: Image-Driven Modeling of Structure-Function Relationship," Communications of the ACM, Vol. 60 No. 1, pp. 74-84, the disclosure of which is hereby incorporated by reference herein in its entirety.

In some embodiments, a spatial adjacency graph or an adjacency matrix is a square matrix used to represent a finite graph. The elements of the matrix indicate whether pairs of vertices are adjacent or not in the graph. An adjacency matrix will always be a square matrix N rows long and N columns wide, where N is the number of cells/nodes/vertices of interest, giving rise to N^2 entries. In some embodiments, a spatial adjacency matrix is derived for all cells in the input image, whereby the spatial adjacency matrix is a square matrix with the number of rows and columns being equal, and where each row and column corresponds to one cell in the input image. In some embodiments, the nodes (e.g. cell nodes) within an adjacency matrix are created by analyzing cells within an about 30 to about 70-micron distance of each other. The spatial radius around a cell to look for is biologically specific to a particular tissue type and the underlying biological hypothesis. In other embodiments, the nodes (e.g. cell nodes) within an adjacency matrix are created by analyzing cells within an about 40 to about 60-micron distance of each other. In yet other embodiments, the nodes within an adjacency matrix are created by analyzing cells within about 50 microns of each other.

The concept of an adjacency matrix may be extended to derive relationships between cells in an input image of biological sample stained with one or more stains. In some embodiments, the adjacency matrix is unweighted, where the cells are either related (or connected) or not, i.e. all edges within the adjacency matrix are binary and equal in importance. In other embodiments, the adjacency matrix is weighted, i.e. weights are assigned that reflect a certain property of a relationship (or connection) between the cells. In some embodiments, non-zero column weights in a row correspond to a "feature distance" between the cell and its adjacent cells. In some embodiments, a feature distance is a Euclidean distance between two cells, a physical distance, a cell size, a density factor, or any other similarity feature or similarity property of cells that may be defined. In other embodiments, the feature distance are cell level attributes such as convexity, size, physical contact, shape, etc. In the absence of any other similarity measure between a pair of cells, one can adapt a simple Euclidean distance measure as a feature distance. There can be other distance measures such as "correlation," "cross entropy," "Hamming distance," etc.; and the distance can be a simple spatial distance or a distance measure defined on the values of the cell features. In information theory, the cross entropy between two probability distributions p and q over the same underlying set of events measures the average number of bits needed to identify an event drawn from the set, if a coding scheme is used that is optimized for an "unnatural" probability distribution q, rather than the "true" distribution p.

Following generation of the spatial adjacency matrix (step 500), clusters are identified using a community network optimization method (step 510). Without wishing to ne bound by any particular theory, it is believed that each community constitutes a spatial coherent cluster of cells (nodes). This formulation allows to grow and detect irregularly shaped but coherent spatial clusters of cells, reflective of the glandular or local tissue morphology. In information theory, the Hamming distance between two strings of equal length is the number of positions at which the corresponding symbols are different. In other words, it measures the minimum number of substitutions required to change one string into the other, or the minimum number of errors that could have transformed one string into the other. In a more general context, the Hamming distance is one of several string metrics for measuring the edit distance between two sequences.

The fundamental idea behind some community detection methods is to partition the nodes (cells) of the network (image of cells) into modules or tumor clusters. Contrary to standard graph partitioning algorithms, the detection of communities is performed without a priori specifying the number of modules nor their size and aims at uncovering in an automated way the mesoscale organization of the network. One method of detecting communities (step 510), i.e. gathering of vertices into groups such that there is a higher density of edges within groups than between them, is by a spectral clustering approach. Without wishing to be bound by any particular theory, it is believed that spectral clustering techniques make use of the spectrum (eigenvalues) of the similarity matrix of the data to perform dimensionality reduction before clustering in fewer dimensions. The similarity matrix is provided as an input and consists of a quantitative assessment of the relative similarity of each pair of points in the dataset. Given an enumerated set of data points, the similarity matrix may be defined as a symmetric matrix A, where $A_{ij} \geq 0$ A represents a measure of the similarity between data points with indices i and j. The general approach to spectral clustering is to use a standard clustering method (e.g. k-means clustering, whereby k-means clustering aims to partition n observations into k clusters in which each observation belongs to the cluster with the nearest mean, serving as a prototype of the cluster) on relevant eigenvectors of a Laplacian matrix of A (the underlying matrix A can be different with different feature distance metrics). There are many different ways to define the feature distance and clustering criteria, and so the clustering will also have different interpretations. The eigenvectors that are relevant are the ones that correspond to smallest several eigenvalues of the Laplacian except for the smallest eigenvalue which will have a value of 0. For computational efficiency, these eigenvectors are often computed as the eigenvectors corresponding to the largest several eigenvalues of a function of the Laplacian. Additional information on this technique is described in M. Fiedler, "Algebraic connectivity of graphs," Czech. Math. J. 23, 298 {305 (1973) and A. Pothen, H. Simon, and K.-P. Liou, "Partitioning sparse matrices with eigenvectors of graphs," SIAM J. Matrix Anal. Appl. 11, 430 {452 (1990), the disclosures of which are hereby incorporated by reference herein in their entireties.

In other embodiments, a community networks algorithm is employed that comprises two steps. First, such an algorithm involves the iterative removal of edges from the "network," (i.e. image of cells) to split it into communities, the edges removed being identified using any one of a number of possible "betweenness" measures; and second, these measures are, crucially, recalculated after each removal (see Aaron Clauset et al., "Finding community structure in very large networks," Phys. Rev. E 70, 066111 (2004), the disclosure of which is hereby incorporated by reference herein in its entirety).

In some embodiments, community detection comprises detecting edges according to the values of a centrality measure (the edge "betweenness") that expresses the importance of the role of the edges in the processes where signals are transmitted across the graph following paths of minimal length. (see M. E. J. Newman and M. Girvan, "Finding and evaluating community structure in networks," Phys. Rev. E 69, 026113, February 2004, the disclosure of which is hereby incorporated by reference herein in its entirety). The Girvan-Newman algorithm detects communities by progressively removing edges from the original network. The connected components of the remaining network are the communities. Instead of trying to construct a measure that tells us which edges are the most central to communities, the Girvan-Newman algorithm focuses on edges that are most likely "between" communities. Vertex betweenness is an indicator of highly central nodes in networks. For any node i, vertex betweenness is defined as the number of shortest paths between pairs of nodes that run through it. It is relevant to models where the network modulates transfer of goods between known start and end points, under the assumption that such transfer seeks the shortest available route.

The Girvan-Newman algorithm extends this definition to the case of edges, defining the "edge betweenness" of an edge as the number of shortest paths between pairs of nodes that run along it. If there is more than one shortest path between a pair of nodes, each path is assigned equal weight such that the total weight of all of the paths is equal to unity. If a network contains communities or groups that are only loosely connected by a few inter-group edges, then all shortest paths between different communities must go along one of these few edges. Thus, the edges connecting communities will have high edge betweenness (at least one of them). By removing these edges, the groups are separated from one another and so the underlying community structure of the network is revealed.

The Girvan-Newman algorithm employs the following steps: (i) the betweenness of all existing edges in the network is calculated; (ii) the edge with the highest betweenness is removed; (iii) the betweenness of all edges affected by the removal is recalculated; and (iv) steps (ii) and (iii) are repeated until no edges remain. The end result of the Girvan-Newman algorithm is a dendrogram.

In other embodiments, the strength of a node i in the community detection "problem" is defined as in Equation (1), where A is the adjacency matrix and, by definition, A is symmetric and $A_{ij}$ is the weight of the link between i and j. The total weight in the network may be given by Equation (2). The distance between nodes i and j is denoted by di. By distance, it is meant Euclidian distance between nodes when measured on the embedding space, which is the number of edges traversed along the shortest path from one vertex to another. As discussed above, the nature of space and its associated distance may be abstract given by the "feature distance" chosen as a weight for the adjacency matrix.

$$k_i = \Sigma_j A_{ij} \tag{1}$$

$$m = \Sigma_{ij} A_{ij}/2 \tag{2}$$

Behind most community detection methods is a mathematical definition measuring the quality of a partition. The widely used modularity of a partition measures if links are more abundant within communities than would be expected on the basis of chance, namely:

Q=(fraction of links within communities)−(expected fraction of such links)

As such, modularity may be given by Equation (3):

$$Q = \frac{1}{2m} \sum_{c \in \mathcal{P}} \sum_{ij \in C} [A_{ij} - P_{ij}], \tag{3}$$

where i, j∈ C is a summation over pairs of nodes i and j belonging to the same community C of P and therefore counts links between nodes within the same community.

What is meant by chance (i.e., the null hypothesis) is embodied by the matrix $P_{ij}$. $P_{ij}$ is the expected weight of a link between nodes i and j over an ensemble of random networks with certain constraints. These constraints correspond to known information about the network organization (i.e., its total number of links and nodes), which has to be taken into account when assessing the relevance of an observed topological feature. In general, if Au is symmetric, Pu is also chosen to be symmetric and one also imposes that the total weight is conserved (see Equation (4)). Beyond these basic considerations, different null models can be constructed depending on the network under consideration. The most popular choice, proposed by Newman and Girvan (NG) as depicted in Equation (5) (see M. E. J. Newman and M. Girvan, noted above).

$$\Sigma_{ij} A_{ij} = \Sigma_{ij} P_{ij} = 2m \tag{4}$$

$$P_{ij}^{NG} = k_i k_j / 2m, \text{ then } Q = Q_{NG} \tag{5}$$

here randomized networks preserve the strength of each node. Constraining the node strengths goes along the view that the network is well mixed, in the sense that any node can be connected to any node and that only connectivity matters. In that case, it is believed that node strength is a good proxy for the probability of a link to arrive on a certain node. Different types of heuristics can be developed in order to approximate the optimal value of the corresponding Newman and Girvan modularity.

As alternative to the null model proposed by Newman and. Girvan, in networks where distance strongly affects the probability for two nodes to be connected, a natural choice for the null model is given by Equation (6)

$$P_{ij}^{Spa} = N_i N_j f(d_{ij}) \tag{6}$$

where Ni measures the importance of location, a notion of the importance of node i and a deterrence function (Equation 7):

$$f(d) = \frac{\sum_{i,j|d_{ij}=d} A_{ij}}{\sum_{i,j|d_{ij}=d} N_i N_J}, \tag{7}$$

is the weighted average of the probability $A_{ij}/(N_i N_j)$ for a link to exist at distance d. It is thus directly measured from the data and not fitted by a determined functional dependence. By construction, the total weight of the network is conserved.

Other methods of detecting community networks are described by Paul Expert et al., "Uncovering space-independent communities in spatial networks," vol. 108 no. 19, pp. 7663-7668, doi: 10.1073/pnas.1018962108, the disclosure of which is hereby incorporated by reference herein in its entirety.

FIGS. 7-10 illustrate clusters identified using the aforementioned concepts.

Registration Module

Following identification of the spatially homogeneous tumor or cell clusters in the first image (assuming, of course, that a simplex image is used as the input image), those identified tumor or cell clusters are then mapped to one or more additional images (step 320) using the image registration module 209 (see FIGS. 2 and 3A). In doing so, all of the images may become mapped to a common coordinate system. If a set of simplex images are given for a tissue block, from which multiple simplex tissue slides are generated, then cells and/or regions may be detected in the first input image and those detected cells and/or regions may be mapped to the adjacent serial section tissue slides.

In some embodiments, cell clusters are identified in a first image which is an H&E image, and those identified cell clusters are mapped to biomarker images (simplex images or unmixed image channel images from a multiplex image) using the registration algorithm described herein. For example, clusters identified in an H&E image may be mapped to one or more of a plurality of simplex images having a single stain; or mapped to one or more of a plurality of unmixed image channel images derived from a multiplex image.

In other embodiments, cell clusters are identified in a first biomarker image, and those identified cell clusters are mapped to additional biomarker images (simplex or multiplex) or an H&E image using the registration algorithm described herein.

Of course, if all of the images to be mapped are derived from a single multiplex image, then registration is not necessary since all images will be from the same tissue sample slice. For example, if the acquired image is a multiplex image stained with H&E and one or more biomarker stains, no registration step is needed after unmixing of the multiplex image and identification of the spatially homogeneous tumor or cell clusters.

Mapping of the identified clusters from the first image to one or more additional images, allows expression scores (described herein) to be derived for each biomarker (or stain) in each cluster in each image. By way of example, if the identified clusters are mapped from an H&E image to one or more biomarker images (where each biomarker is stained for one of ER, PR, or Ki-67), following registration the clusters identified in the H&E image may be mapped to the same areas in the ER, PR, and Ki-67 biomarker images such that expression scores for ER, PR, and Ki-67 may be derived in each cluster in each image.

In general, registration comprises selecting one input image, or a portion thereof (e.g. a cell cluster), to serve as a reference image, and computing a transformation of each other input image to the coordinate frame of the reference image. Accordingly, all the input images may be aligned to the same coordinate system (e.g. the reference coordinate can be the slide section in the middle of the tissue block in the case of serial tissue sections or the slide with a specific marker) using image registration. Each image may therefore be aligned from its old coordinate system to the new reference coordinate system.

Registration is the process of transforming different sets of data, here images, or cell cluster within images, into one coordinate system. More specifically, registration is the process of aligning two or more images and, in general, involves designating one image as the reference (also called the reference image or the fixed image), and applying geometric transformations to the other images so that they align with the reference. A geometric transformation maps locations in one image to new locations in another image. The step of determining the correct geometric transformation parameters is key to the image registration process. The methods for computing a transformation of each image to a reference image are well known to those skilled in the art. For example, an image registration algorithm is described, for example, in "11th International Symposium on Biomedical Imaging (ISBI), 2014 IEEE, Apr. 29, 2014-May 2, 2014), the disclosure of which is hereby incorporated by reference herein in its entirety. A detailed method of image registration is outlined below.

Registration processes are well known in the art and any of the known methods may be applied to the present disclosure. In some embodiments, the image registration is performed using the methods described in WO/2015/049233, entitled "Line-Based Image Registration and Cross-Image Annotation Devices, Systems and Methods," filed on Sep. 30, 2014, the disclosure of which is hereby incorporated by reference herein in its entirety. WO/2015/049233 describes a registration process comprising a coarse registration process used alone or in combination with a fine registration process. In some embodiments, the coarse registration process may involve selecting digital images for alignment, generating a foreground image mask from each of the selected digital images, and matching tissue structure between the resultant foreground images. In further embodiments, generating a foreground image mask involves generating a soft-weighted foreground image from the whole slide image of a stained tissue section and applying OTSU thresholding to the soft-weighted foreground image to produce a binary soft-weighted image mask. In other further embodiments, generating a foreground image mask involves generating a binary soft-weighted image mask from a whole slide image of a stained tissue section, separately generating a gradient magnitude image mask from the same whole slide image, applying OTSU thresholding to the gradient image mask to produce a binary gradient magnitude image mask, and combining the binary soft-weighted image and the binary gradient magnitude image mask using a binary OR operation to generate the foreground image mask. A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. A "gradient orientation feature" may be a data value that indicates the orientation of the gradient within said coordinate system. In some embodiments, matching tissue structure involves computing line-based features from the boundary of each of the resultant foreground image masks, computing global transformation parameters between a first set of line-features on a first foreground image mask and a second set of line-features on a second foreground image mask, and globally aligning the first and second image based on the transformation parameters. In yet further embodiments, the coarse registration process includes mapping the selected digital images based on the global transformation parameters to a common grid, which grid may encompass the selected digital images. In some embodiments, the fine registration process may involve identifying a first sub-region of a first digital image in the set of aligned digital images; identifying a second sub-region on a second digital image in the set of aligned digital images, wherein the second sub-region is larger than the first sub-region and the first sub-region is located substantially within the second sub-region on common grid; and, computing an optimized location for the first sub-region in the second sub-region.

Figure 6:
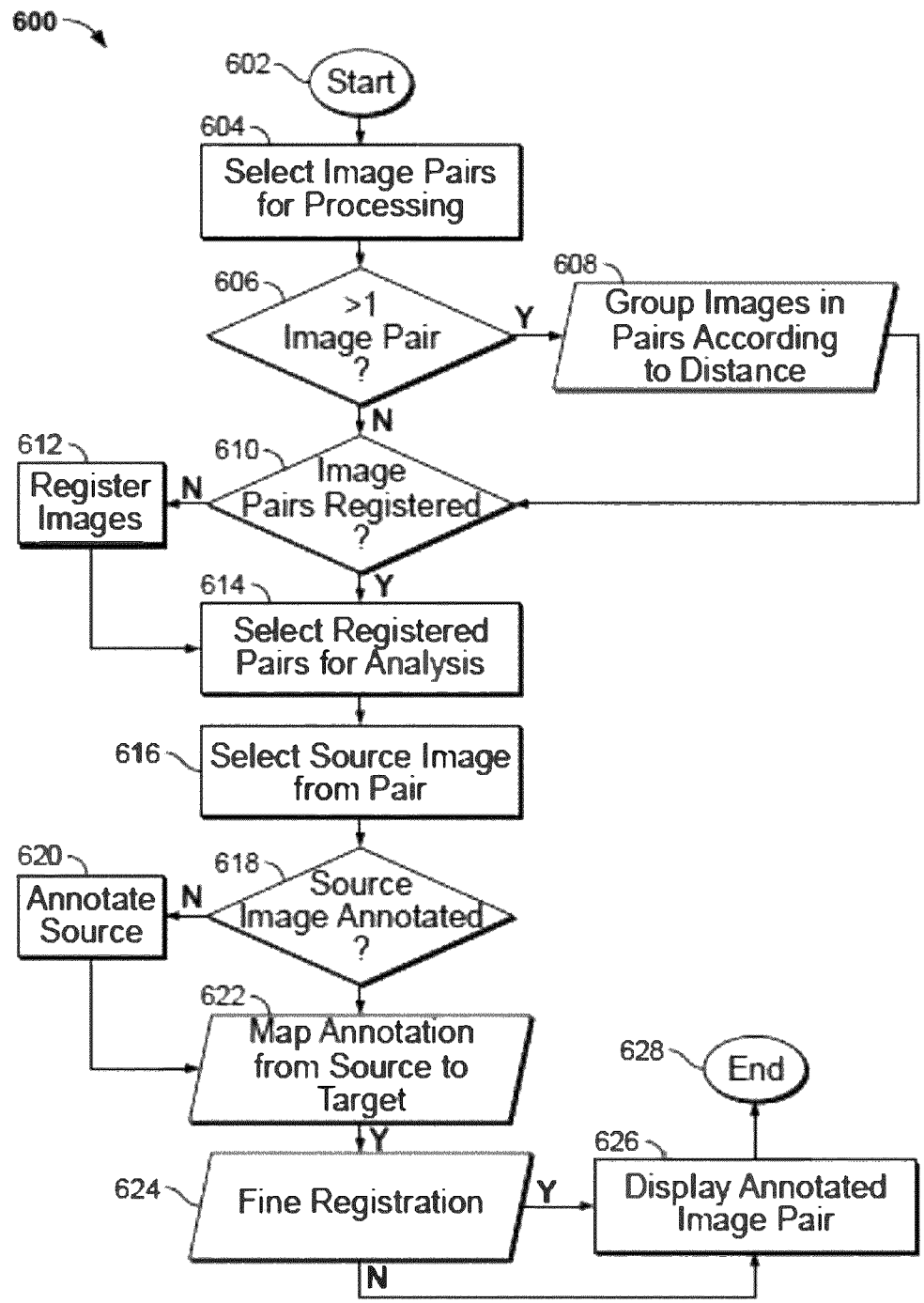
FIG. 6 illustrates the steps of registering a multiple images to a common coordinate system, in accordance with some embodiments.
Figure 7A:
FIG. 7A illustrates an identified tumor within a whole slide image.
Figure 7B:
FIG. 7B illustrates various identified cell clusters.
Figure 8A:
FIG. 8A illustrates an identified tumor within a whole slide image.
Figure 8B:
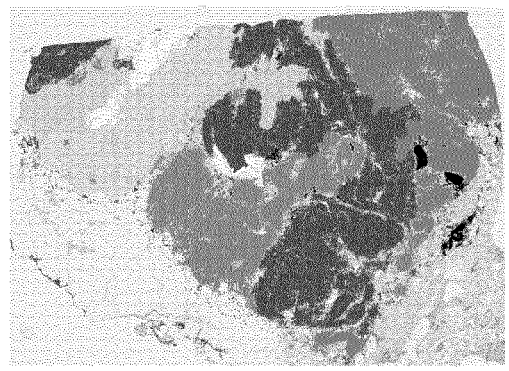
FIG. 8B illustrates various identified cell clusters.
Figure 9A:
FIG. 9A illustrates an identified tumor within a whole slide image.
Figure 9B:
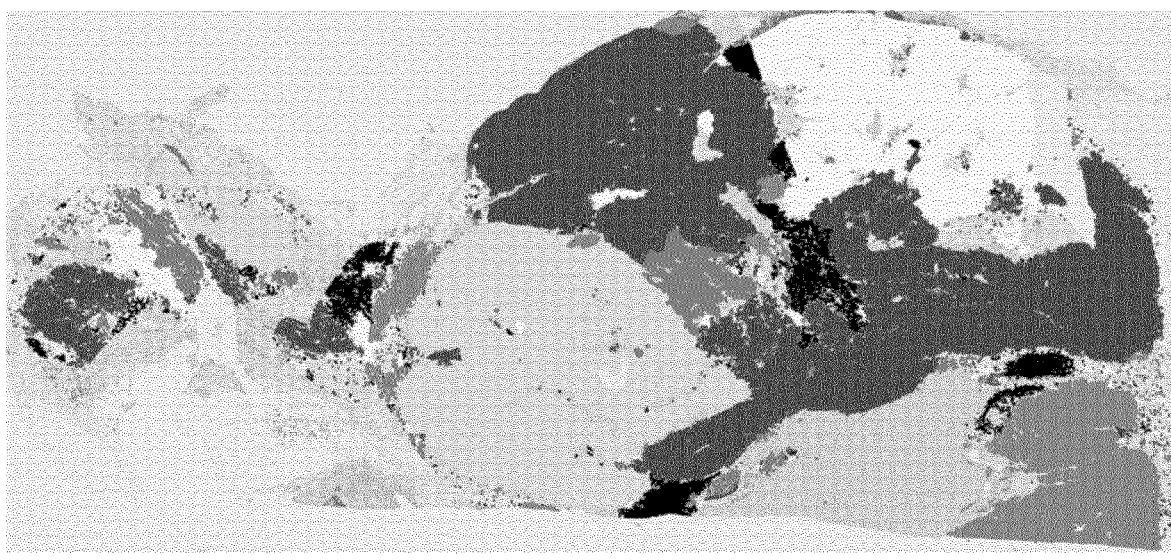
FIG. 9B illustrates various identified cell clusters.
Figure 10B:
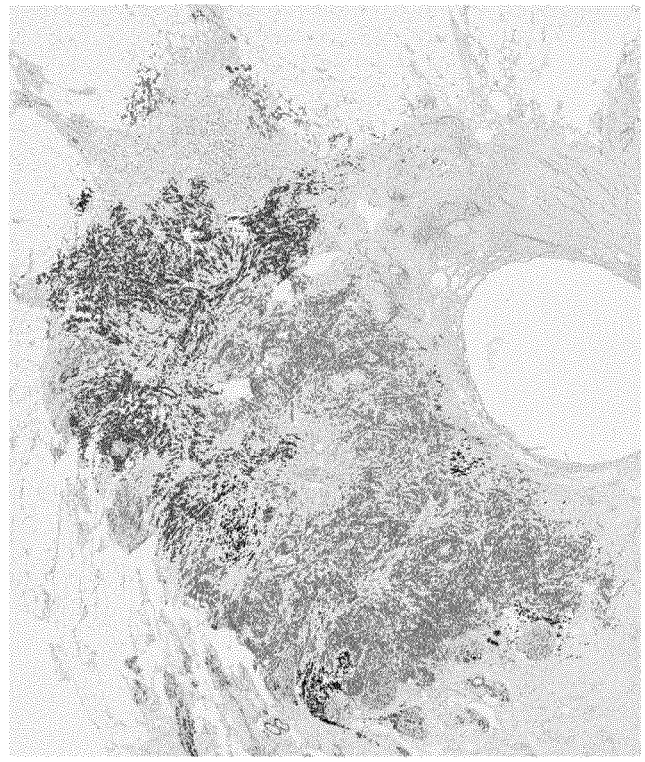
FIG. 10B illustrates various identified cell clusters.
Figure 10A:
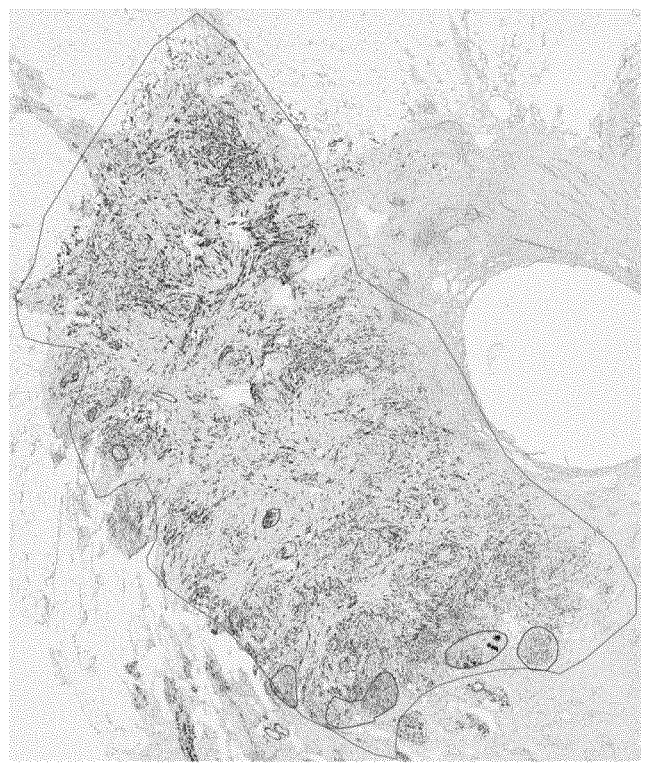
FIG. 10A illustrates an identified tumor within a whole slide image.

These methods are illustrated in FIG. 6 herein, where the method 600 begins at the start block 602. At block 604, a set of image data or digital images is acquired (e.g. scanned or selected from the database) for manipulation. Each set of image data includes image data corresponding to, for example, a tissue section from a set of adjacent tissue sections of a single patient. At block 606, if only a single image pair is selected, the process proceeds directly to block 610. If more than a single pair of images is selected, then the set of selected images is grouped into pairs at block 608 prior to proceeding to block 610. In some embodiments, image pairs are selected as adjacent pairs. Thus, for example, if the set of selected images includes 10 parallel, adjacent slices (L1 . . . L1 0), then L1 and L2 are grouped as a pair, L3 and L4 are grouped as a pair, etc. On the other hand, if information is not available as to which pairs of images are most similar to each other then, in some embodiments, images are grouped according to their distance apart, (e.g., inter-edge or inter-image distance corresponding to the chamfer distance between the edge-maps of the various images), pairing together images which are closest to one another. In exemplary embodiments of the present disclosure, an inter-edge/inter-image distance is utilized to pair of images. In some embodiments, edge-based Chamfer distance may be used to compute the inter-image/inter-edge distance. If the pairs of images have previously undergone a coarse registration process, such that the images have been coarsely aligned and the results have been saved, the process advances to block 614. Otherwise, at block 612 a coarse registration process is performed on the selected image pairs. The coarse registration process is described in further detail below.

Passing to block 614, the selected, and now registered (aligned), images are displayed on a common grid, with the images overlaid in a single image, displayed as separate images, or both, on a single monitor or spread across several monitors. At block 616, the client user may select one of the images from a pair of images as the source image. If the source image has already been annotated as desired, the process proceeds to block 622. Otherwise, the client user annotates the source image as desired at block 620. At block 622, which may (or may not) occur substantially simultaneously with block 620, the annotation is mapped to the other image in the pair (the target image) and graphically reproduced on the target image. In embodiments wherein annotation occurs prior to coarse registration, the annotation may be mapped from the source image to the target image at substantially the same time as the pair of images is registered (aligned). At block 624, the user may choose to whether or not to engage in a fine registration process. If the user chooses to directly display the results without performing fine registration, the process proceeds to block 626.

Otherwise, at block 624 a fine registration process is performed on the selected image pairs, for example to optimize the location of the mapped annotations and/or alignment of the images. The fine registration process is discussed in further detail below. At block 626, the annotated image pair is displayed with the results of the fine registration process (or the annotated image pair may be displayed only with the results of the coarse registration process if fine registration is not used). The method then ends at the final block 628.

Scoring Module

Following identification of the spatially homogeneous tumor or cell clusters and/or the mapping of the tumor or other cell clusters in all images (step 320) using the image registration module 209, a variety of marker expression scores are calculated for each stain or biomarker within each cell cluster within each image (simplex images or unmixed image channel images from a multiplex image) (step 330) using the scoring module 210.

The scoring module, in some embodiments, utilizes data acquired during the detection and classification of cells at step 300. For example, the image analysis module 207 may comprise a series of image analysis algorithms and may be used to determine a presence of one or more of a nucleus, a cell wall, a tumor cell, or other structures within the identified cell clusters, as described herein. In some embodiments, derived stain intensity values and counts of specific nuclei for each field of view may be used to determine various marker expression scores, such as percent positivity or an H-Score. Methods for scoring are described in further detail in commonly-assigned and co-pending applications WO/2014/102130A1 "Image analysis for breast cancer prognosis" filed Dec. 19, 2013, and WO/2014/140085A1 "Tissue object-based machine learning system for automated scoring of digital whole slides", filed Mar. 12, 2104, the contents of each are hereby incorporated by reference in their entirety herein.

By way of example, automated image analysis algorithms in the image analysis module 207 may be used to interpret each one of the IHC slides in the series to detect tumor nuclei that are positively and negatively stained for a particular biomarker, such as Ki67, ER, PR, HER2, etc. Based on the detected positive and negative tumor nuclei, various slide level scores such as marker percent positivity, H-scores, etc. may be computed using one or more methods.

In some embodiments, the expression score is an H-score. In some embodiments, the 'H' score is used to assess the percentage of tumor cells with cell membrane staining graded as 'weak,' moderate' or 'strong.' The grades are summated to give an overall maximum score of 300 and a cut-off point of 100 to distinguish between a 'positive' and 'negative.' For example, a membrane staining intensity (0, 1+, 2+, or 3+) is determined for each cell in a fixed field of view (or here, each cell in a tumor or cell cluster). The H-score may simply be based on a predominant staining intensity, or more complexly, can include the sum of individual H-scores for each intensity level seen. By one method, the percentage of cells at each staining intensity level is calculated, and finally, an H-score is assigned using the following formula: [1×(% cells 1+)+2×(% cells 2+)+3×(% cells 3+)]. The final score, ranging from 0 to 300, gives more relative weight to higher-intensity membrane staining in a given tumor sample. The sample can then be considered positive or negative on the basis of a specific discriminatory threshold. Additional methods of calculating an H-score are described in United States Patent Publication 2015/0347702, the disclosure of which is hereby incorporated by reference herein in its entirety.

In some embodiments, the expression score is an Allred score. The Allred score is a scoring system which looks at the percentage of cells that test positive for hormone receptors, along with how well the receptors show up after staining (this is called "intensity"). This information is then combined to score the sample on a scale from 0 to 8. The higher the score, the more receptors are found and the easier they are to see in the sample.

In other embodiments, the expression score is percent positivity. Again, in the context of scoring a breast cancer sample stained for the PR and Ki-67 biomarkers, for the PR and Ki-67 slides, the percent positivity is calculated (e.g., the total number of nuclei of cells (e.g., malignant cells) that are stained positive in each field of view in the digital image of a slide are summed and divided by the total number of positively and negatively stained nuclei from each of the fields of view of a digital image) in a single slide as follows: Percent positivity=number of positively stained cells/(number of positively stained cells+number of negatively stained cells).

In other embodiments, the expression score is an immunohistochemistry combination score, which is a prognostic score based on a number of IHC markers, wherein the number of markers is greater than one. IHC4 is one such score based on four measured IHC markers, namely ER, HER2, Ki-67, and PR in a breast cancer sample (for example see Cuzick et al., J. Clin. Oncol. 29:4273-8, 2011, and Barton et al., Br. J. Cancer 1-6, Apr. 24, 2012, both herein incorporated by reference). In one example, and in the context of detecting expression scores for breast cancer, an IHC4 score is calculated using, for example, the following formula:

$$IHC4=94.7\times\{-0.100ER10-0.079PR10+0.586HER2+0.240 \ln(1+10\times Ki67)\}.$$

For example, assume that an image comprises three identified tumor clusters, and assume further that three biomarker images are acquired, one for each of ER, PR, and Ki-67. Further, assume that all identified clusters have been mapped to each of the biomarker images to provide mapped clusters as described herein. For a first identified cluster in each image, we would be able to derive ER, PR, and Ki-67 expression scores. Likewise, for each of the second and third clusters, we would be able to derive unique ER, PR, and Ki-67 scores. Said another way, in this example we would have a vector of expressions scores for each identified and mapped cluster, e.g. for [ER(1), PR(1), Ki-67(1)], [ER(2), PR(2), Ki-67(2)], [ER(3), PR(3), Ki-67(3)], where ER(1), ER(2), and ER(3) represent the expression scores of ER in the first, second, and third clusters; PR(1), PR(2), and PR(3) represent the expression scores of PR in the first, second, and third clusters; and Ki-67(1), Ki-67(2), and Ki-67(3) represent the expression scores of Ki-67 in the first, second, and third clusters.

Inter-Marker Heterogeneity Metric Generation Module

Following determination of expression scores for each marker in each identified cluster or mapped cluster (step 330), spatial heterogeneity metrics (i.e. the variation between a single stain or marker) and/or inter-marker spatial heterogeneity metrics (i.e. the variation across multiple stains or markers) are derived between the various identified clusters (step 340) using the inter-marker heterogeneity metric generation module 211.

As the skilled artisan will appreciate, scoring may be utilized as a predictive measure or to guide treatment. For example, and in the context of breast cancer and the ER and PR biomarkers, a sample that tests positive may guide the decision to provide hormonal therapy during the course of treatment. The skilled artisan will also appreciate that not all clusters within a biological sample may have the same score for any particular marker. By being able to determine a heterogeneity score or metric describing the variability between clusters, additional guidance may be provided to make an informed treatment decision. Moreover, heterogeneity can be an indicator of the spatial variation of tumor aggressiveness and/or growth patterns that can be correlated with an aggregated clinical phenotype (e.g., a tumor likely to recur).

In some embodiments, heterogeneity is determined to measure how different clusters compare to each other. Heterogeneity can be measured by a variability metric describing how, for example, different the protein expression levels among the various identified and mapped clusters compared with each other, as described herein. In some embodiments, heterogeneity is measured between all clusters identified. In other embodiments, heterogeneity is measured between only a subset of identified clusters (e.g. clusters meeting certain predetermined criteria).

In some embodiments, a quantitative measure of spatial heterogeneity (e.g., heterogeneity among the identified and mapped clusters for a single stain or marker) can be calculated based on a deviation (e.g., standard deviation or other moment of the distribution) of protein expression measurement, PE (e.g., percent positivity), in the different identified and mapped clusters comprising a series of biomarkers (e.g., ER, PR, Ki-67, or the like). Such a measurement can quantify how far apart (e.g., the spread of distribution) protein expression measurements are. For example, an exemplary spatial heterogeneity calculation for a set of clusters having respective protein expression measurements $PE(CL1), PE(CL2), \ldots PE(CL_N)$ for a given biomarker in the mapped clusters:

Heterogeneity $(H)=\sigma(PE(CL1),PE(CL2), \ldots PE(CL_N))$

By way of another example, in some embodiments ER and PR protein spatial heterogeneity may be measured or detected using the identified tumor clusters. For example, measuring protein heterogeneity can include determining a variability metric (VM) for each of ER, and PR, wherein $VM=STD(PP(CL1), PP(CL2), \ldots PP(CL_N))$. PP(CL) is the percent positivity for each identified tumor cluster, CL (e.g., the mapped clusters in one or more images of a tissue sample that has been contacted with an agent specific for ER probe, an agent specific for PR, or the like). Based on the variability metric, a heterogeneity score for each of ER and PR may be determined or calculated. For example, the heterogeneity score for each of ER and PR can be calculated using the following formula, where $\alpha=[0,1]$ (e.g., a number ranging from 0 to 1) is a normalization factor, and S is an average percent positivity slide score as described by Equation (8):

$$H = \begin{cases} \alpha * \dfrac{VM}{0.05}, & S < 10\% \\ \alpha * \dfrac{VM}{S}, & \text{otherwise} \end{cases} \quad (8)$$

Variability metrics (VM) other than standard deviation, σ, can be used to measure protein heterogeneity. For example, differences in protein expression measurements or a maximum thereof between identified and mapped clusters can be used. In some embodiments, a heterogeneity calculation for identified and mapped clusters having respective protein expression (PE) measurements for fields of view CL1, CL2, CL3 for a given biomarker can be calculated as follows using an absolute value (ABS) function:

$VM=MAX(ABS(PE(CL1)-PE(CL2)),ABS(PE(CL1)-PE(CL3)),ABS(PE(CL2)-PE(CL3)))$

Normalization of H-scores across clusters may also be utilized as a metric. For example, normalization can be achieved by dividing an observed deviation between clusters by an average slide score for the particular biomarker. This can be repeated for each biomarker in the identified and mapped clusters.

Methods of calculating other spatial heterogeneity metrics are described in United States Patent Publication No. 2015/0347702, the disclosures of which are incorporated by reference herein in their entireties.

In some embodiments, the inter-marker heterogeneity using the expression scores of different markers for each cluster is determined. For example, in an image with 4 markers, the scores in one cluster (or one mapped cluster) may be (30, 20, 40, 80). And similarly, the scores for a different cluster can be (70, 20, 60, 10). If there are N clusters overall, we will have N such vectors of expression scores. What we are computing is a numerical metric to quantify the variability of the scores in the vectors. An example of such a metric is an average expression score, averaged over all clusters. Using the two vectors above, the average score would provide the following vector of scores: (50, 20, 50, 45). It is possible to then compute the difference score for each cluster: for the first cluster above it will be: (−20, 0, −10, 35) and for second cluster it will be (20, 0, 10, −35).

In some embodiments, the inter-marker heterogeneity metric may be a root mean square of the difference between the vectors. In statistics and its applications, the root mean square is defined as the square root of mean square (the arithmetic mean of the squares of a set of numbers).

In some embodiments, the variations between scores may be based on a weighted average.

In other embodiments, a categorical score may be computed. For example, a binning score may be used to binarize each marker expression as:

For marker 1: >10=>Positive otherwise Negative.
For marker 2: >1=>Positive otherwise Negative
For marker 3: >50=>Positive otherwise Negative
For marker 4: >15=>Positive otherwise Negative.
Using the above data:
On average (+, +, +, +) for four markers.
For cluster 1—(+, +, −, +)
For cluster 2—(+, +, +, −)

A distance metric may then be computed based on the binarized scores (e.g. a Hamming distance as described above) or the number of clusters that have a different score combination from the average cluster score.

In some embodiments, inter-marker heterogeneity metrics include the variation of the vector of expression scores in different clusters.

Another form of inter-marker heterogeneity can be: where spatial heterogeneity is computed for each marker (across different clusters) and the inter-marker heterogeneity can be a either sum/variation/squared sum of the individual marker heterogeneity scores. Another measure of inter-marker spatial heterogeneity can be a correlation matrix of the vector of expression scores from all the markers. For example, if there are N clusters and thus N expression score vectors, and there are M markers—the correlation matrix will a M×M matrix which will be given by the Spearman correlation matrix of the values. Spearman rank correlation is a non-parametric test that is used to measure the degree of association between two variables. Spearman rank correlation test does not assume any assumptions about the distribution of the data and is the appropriate correlation analysis when the variables are measured on a scale that is at least ordinal.

Other Components for Practicing Embodiments of the Present Disclosure

The system 200 of the present disclosure may be tied to a specimen processing apparatus that can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the paraffin is removed, any number of substances can be successively applied to the specimen. The substances can be for pretreatment (e.g., to reverse protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. In some embodiments, the imaging apparatus is a brightfield imager slide scanner. One brightfield imager is the iScan Coreo brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application No. 61/533,114, filed on Sep. 9, 2011, entitled IMAGING SYSTEMS, CASSETTES, AND METHODS OF USING THE SAME. International Patent Application No. PCT/US2010/002772 and U.S. Patent Application No. 61/533,114 are incorporated by reference in their entities.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI system may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

ADDITIONAL EMBODIMENTS

In another aspect of the present disclosure is a system for comparing heterogeneity between cell clusters, the system comprising: (i) one or more processors, and (ii) a memory coupled to the one or more processors, the memory to store computer-executable instructions that, when executed by the one or more processors, cause the one or more processors to perform operations comprising: (i) detecting and classifying cells within a first image of a biological sample having a first stain and within a series of additional images, where each image in the series of additional images comprises a different stain (i.e. is stained for the presence of a different biomarker); (ii) identifying one or more cell clusters within the first image, the cell clusters identified using a graph theoretic approach; (iii) registering the first image and the series of additional images to a common coordinate system such that the identified one or more clusters in the first image are mapped to the series of additional images to provide mapped clusters; and (iv) deriving expression scores for each stain in each of the mapped clusters and (vi) computing a metric to quantify the variability of the expression scores from different clusters In some embodiments, the system further comprises instructions for computing one or more inter-marker heterogeneity scores based on the derived expression scores.

In some embodiments, the graph theoretic approach to identify the cell clusters comprises (i) constructing a spatial adjacency matrix of cells; and (ii) identifying coherent clusters of cells using a graph theoretic algorithm, namely an algorithm to detect "community networks" in a graph. In some embodiments, the constructing of the spatial adjacency matrix for cells comprises (i) defining each cell as a node/vertex in the graph; (ii) identifying cell nodes spaced within about 30 to about 70 microns of each other as connected nodes; and (iii) defining as an edge the link between two connected nodes; and (iv) constructing an adjacency matrix for all the cells/vertices along with the connected edges information thereof. In some embodiments, the procedure to identify of coherent clusters of cells comprises (i) calculating a "betweenness" of all existing edges in the network of cells; (ii) removing the edge having a highest "betweenness;" (iii) recalculating the "betweenness" of all edges affected by the removal; and (iv) repeating steps (ii) and (iii) until no edges remain. In some embodiments, the cells are classified as at least one of tumor cells, stromal cells, or lymphocytes. In some embodiments, the first image is an H&E image, and wherein the series of additional images are biomarker images, e.g. images stained in an IHC assay for a particular biomarker. In some embodiments, the system further comprises instructions for electronically annotating the tumor and pen-tumor region in the image prior to the identification of the one or more cell clusters.

In another aspect of the present disclosure is a system for comparing heterogeneity between cell clusters, the system comprising: (i) one or more processors, and (iii) a memory coupled to the one or more processors, the memory to store computer-executable instructions that, when executed by the one or more processors, cause the one or more processors to perform operations comprising: (i) classifying cells within a first image of a biological sample having a first stain; (ii) identifying one or more cell clusters within the first image, the cell clusters identified using a graph theoretic approach; (iii) registering the first image and a series of additional images to a common coordinate system such that the identified one or more clusters in the first image are mapped to the series of additional images to provide mapped clusters, where each of the series of additional images comprises a different stain; and (iv) deriving expression scores for each stain in each of the mapped clusters.

In another aspect of the present disclosure is a non-transitory computer-readable medium for deriving one or more metrics associated with inter-cluster cell heterogeneity comprising: (i) extracting features from a first image having a first stain, the extracted features used to classify cells within the first image; (ii) identifying one or more cell clusters within the first image based on the cell classification, the cell clusters identified by (a) constructing an adjacency matrix, and (b) identifying coherent clusters of cells using a community networks algorithm; (iii) registering the first image and a series of additional images to a common coordinate system such that the identified one or more clusters in the first image are mapped to the series of additional images to provide mapped clusters, where each of the series of additional images comprises a different stain; (iv) deriving expression scores for each stain in each of the mapped clusters; and (v) computing one or more inter-marker heterogeneity scores based on the derived expression scores. In some embodiments, the construction of the adjacency matrix comprises (a) determining cell nodes; and (b) establishing edges between pairs of nodes. In some embodiments, cell nodes are located within about 50 microns of each other.

In another aspect of the present disclosure is a method of computing inter-marker heterogeneity scores comprising: (a) classifying cells within a first image having a first stain (e.g. as tumor cells, lymphocytes, stroma, etc.); (b) identifying spatially homogeneous cell clusters in the first image based on the cell classification results; (c) mapping the identified spatially homogenous clusters from the first image to each of a series of additional images to provide mapped clusters in each image, wherein each of the series of additional images have a different stain; (d) deriving expression scores for each stain in each cluster in the first image and in each mapped cluster in the series of additional images; and (e) calculating one or more inter-marker heterogeneity metrics.

A system for analyzing intra-tumor variability, the system comprising: one or more processors, and a memory coupled to the one or more processors, the memory to store computer-executable instructions that, when executed by the one or more processors, cause the one or more processors to perform operations comprising: unmixing a multiplex image into a series of unmixed image channel images; classifying cells within a first unmixed image channel image; identifying one or more cell clusters within the first unmixed image channel image, the cell clusters identified using a graph theoretic approach; and deriving expression scores for each stain in each of the remaining unmixed image channel images. In some embodiments, the system further comprises instructions for computing one or more inter-marker heterogeneity scores based on the derived expression scores.

A method of computing inter-marker heterogeneity scores for a biological sample having a plurality of stains comprising: unmixing a multiple image into a series of unmixed image channel images; detecting and classifying cells within a first of the unmixed image channel images; identifying spatially homogeneous cell clusters in the first of the unmixed image channel images using the cell classification results; deriving expression scores for each stain in each cluster in the first of the unmixed image channel images and in each of the remaining unmixed image channel images; and calculating one or more inter-marker heterogeneity scores between identified clusters. In some embodiments, the method further comprising detecting and classifying cells in each of the remaining unmixed image channel images.

A system for analyzing intra-tumor variability, the system comprising: (i) one or more processors, and (ii) a memory coupled to the one or more processors, the memory to store computer-executable instructions that, when executed by the one or more processors, cause the system to perform operations comprising: (i) classifying cells within a first image of a biological sample having a first stain; (ii) identifying one or more cell clusters within the first image, the cell clusters identified using a graph theoretic approach; (iii) registering the first image and a series of additional images to a common coordinate system such that the identified one or more clusters in the first image are mapped to the series of additional images to provide mapped clusters, where each of the series of additional images comprises a different stain; (iv) detecting and classifying cells for each image in the series of additional images; (v) deriving expression scores corresponding to each stain in each cluster in the first image and in each mapped cluster in the series of additional images; and (vi) computing one or more inter-marker heterogeneity scores based on the derived expression scores.

A system for analyzing intra-tumor variability, the system comprising: (i) one or more processors, and (ii) a memory coupled to the one or more processors, the memory to store computer-executable instructions that, when executed by the one or more processors, cause the system to perform operations comprising: (i) classifying cells within a first image of a biological sample having a first stain; (ii) identifying one or more cell clusters within the first image, the cell clusters identified using a graph theoretic approach; (iii) registering the first image and a plurality of additional images to a common coordinate system such that the identified one or more clusters in the first image are mapped to the plurality of additional images to provide mapped clusters, where each of the plurality of additional images comprises a different stain; (iv) detecting and classifying cells for each image in the plurality of additional images; (v) deriving expression scores corresponding to each stain in each cluster in the first image and in each mapped cluster in the plurality of additional images; and (vi) computing one or more inter-marker heterogeneity scores based on the derived expression scores.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

In a further embodiment, the operations further comprise the step of electronically annotating the image prior to the identification of the one or more cell clusters.

The invention claimed is:

1. A method of computing inter-marker heterogeneity scores for a biological sample having a plurality of stains, the method comprising:
   (i) accessing a first image having a first stain;
   (ii) extracting features from the first image to detect cells within the first image;
   (iii) classifying, based on the extracted features, the cells within the first image to generate a cell classification;
   (iv) identifying one or more cell clusters within the first image based on the cell classification, the one or more cell clusters identified by using a graph theoretic approach;
   (v) registering the first image and at least one additional image to a common coordinate system such that the identified one or more cell clusters in the first image are mapped to the at least one additional image to generate mapped clusters for the at least one additional image, wherein the at least one additional image comprises a second stain that is different from the first stain of the first image;
   (vi) classifying, for at least one of cells detected in one or more image regions corresponding to the mapped clusters of the at least one additional image, the cell as being associated with a particular cell type of a plurality of cell types;
   (vii) deriving expression scores for each stain in a cell cluster of the one or more cell clusters within the first image and for a stain in each mapped cluster of the mapped clusters in the at least one additional image; and
   (viii) computing, based on the derived expression scores, one or more inter-marker heterogeneity scores, wherein an inter-marker heterogeneity score of the one or more inter-marker heterogeneity scores identifies, for a corresponding biomarker that identifies a particular type of peptide, a difference of peptide expression levels for the particular peptide type between the one or more clusters of cells within the first image and the mapped one or more clusters of cells within the at least one additional image.

2. The method of claim 1, wherein the graph theoretic approach comprises (i) constructing a spatial adjacency matrix; and (ii) identifying coherent clusters of cells using a community networks algorithm.

3. The method of claim 2, wherein the constructing the spatial adjacency matrix comprises: (i) defining each cell of the cells detected within the first image as a node in a graph, (ii) identifying cell nodes that are spaced at a predetermined distance from each other; (iii) defining a link between two connected nodes as an edge in the graph; and (iv) constructing the spatial adjacency matrix for all the nodes using information associated with the edge.

4. The method of claim 3, wherein the predetermined distance is about 50 microns.

5. The method of claim 3, wherein the identifying of the coherent clusters of cells comprises (i) calculating a betweenness score of two or more existing edges in the graph; (ii) removing an edge of the two or more existing edges having a highest betweenness score; (iii) recalculating the betweenness score of edges of the two or more existing edges that are affected by the removal; and (iv) repeating steps (ii) and (iii) until no edges of the two or more existing edges remain.

6. The method of claim 1, wherein the registration comprises applying a geometric transformation parameter to the at least one additional image to register the at least one additional image to a coordinate system of the first image.

7. The method of claim 1, wherein the one or more inter-marker heterogeneity scores are computed based on a standard deviation among a plurality of derived expression scores for each stain.

8. The method of claim 1, wherein the first image is stained with hematoxylin and eosin (H&E).

9. The method of claim 1, wherein the at least one additional image is stained for a presence of a biomarker and/or wherein the at least one additional image is a biomarker image.

10. The method of claim 9, wherein the biomarker is selected from a group consisting of estrogen receptor (ER), progesterone receptor (PR), Ki-67, and human epidermal growth factor receptor 2 (HER2), or from a group consisting of PD-L1, CD3, and CD8.

11. The method of claim 1, further comprising computing one or more spatial heterogeneity metrics that indicates variation of the expression scores in the first image.

12. The method of claim 1, wherein the cells are classified as at least one of tumor cells, stromal cells, or lymphocytes.

13. The method of claim 1, wherein the expression scores include percent positivity and/or a H-score.

14. A system for analyzing intra-tumor variability, the system comprising: (i) one or more processors, and (ii) a memory coupled to the one or more processors, the memory to store computer-executable instructions that, when executed by the one or more processors, cause the system to perform one or more operations comprising:
(i) accessing a first image having a first stain;
(ii) extracting features from the first image to detect cells within the first image;
(iii) classifying, based on the extracted features, the cells within the first image to generate a cell classification;
(iv) identifying one or more cell clusters within the first image based on the cell classification, the one or more cell clusters identified by using a graph theoretic approach;
(v) registering the first image and at least one additional image to a common coordinate system such that the identified one or more cell clusters in the first image are mapped to the at least one additional image to generate mapped clusters for the at least one additional image, wherein the at least one additional image comprises a second stain that is different from the first stain of the first image;
(vi) classifying, for at least one of cells detected in one or more image regions corresponding to the mapped clusters of the at least one additional image, the cell as being associated with a particular cell type of a plurality of cell types;
(vii) deriving expression scores for each stain in a cell cluster of the one or more cell clusters within the first image and for a stain in each mapped cluster of the mapped clusters in the at least one additional image; and
(viii) computing, based on the derived expression scores, one or more inter-marker heterogeneity scores, wherein an inter-marker heterogeneity score of the one or more inter-marker heterogeneity scores identifies, for a corresponding biomarker that identifies a particular type of peptide, a difference of peptide expression levels for the particular peptide type between the one or more clusters of cells within the first image and the mapped one or more clusters of cells within the at least one additional image.

15. The system of claim 14, wherein the registration comprises applying a geometric transformation parameter to the at least one additional image to register the at least one additional image to a coordinate system of the first image.

16. The system of claim 14, wherein the one or more inter-marker heterogeneity scores are computed based on a standard deviation among a plurality of derived expression scores for each stain.

17. The system of claim 14, wherein the first image is stained with hematoxylin and eosin (H&E).

18. A non-transitory computer-readable medium storing instructions which, when executed by one or more processors perform one or more operations comprising:
(i) accessing a first image having a first stain;
(ii) extracting features from the first image to detect cells within the first image;
(iii) classifying, based on the extracted features, the cells within the first image to generate a cell classification;
(iv) identifying one or more cell clusters within the first image based on the cell classification, the one or more cell clusters identified by using a graph theoretic approach;
(v) registering the first image and at least one additional image to a common coordinate system such that the identified one or more cell clusters in the first image are mapped to the at least one additional image to generate mapped clusters for the at least one additional image, wherein the at least one additional image comprises a second stain that is different from the first stain of the first image;
(vi) classifying, for at least one of cells detected in one or more image regions corresponding to the mapped clusters of the at least one additional image, the cell as being associated with a particular cell type of a plurality of cell types;
(vii) deriving expression scores for each stain in a cell cluster of the one or more cell clusters within the first image and for a stain in each mapped cluster of the mapped clusters in the at least one additional image; and
(viii) computing, based on the derived expression scores, one or more inter-marker heterogeneity scores, wherein an inter-marker heterogeneity score of the one or more inter-marker heterogeneity scores identifies, for a corresponding biomarker that identifies a particular type of peptide, a difference of peptide expression levels for the particular peptide type between the one or more clusters of cells within the first image and the mapped one or more clusters of cells within the at least one additional image.

19. The non-transitory computer-readable medium of claim 18, wherein the graph theoretic approach comprises (i) constructing a spatial adjacency matrix; and (ii) identifying coherent clusters of cells using a community networks algorithm.

20. The non-transitory computer-readable medium of claim 18, wherein the at least one additional image is stained for a presence of a biomarker and/or wherein the at least one additional image is a biomarker image.

* * * * *